(12) United States Patent
Szabo et al.

(10) Patent No.: US 9,973,692 B2
(45) Date of Patent: May 15, 2018

(54) SITUATIONAL AWARENESS BY COMPRESSED DISPLAY OF PANORAMIC VIEWS

(71) Applicant: FLIR Systems, Inc., Wilsonville, OR (US)

(72) Inventors: Matthew Joseph Szabo, Stillwater, OK (US); Phillip Vickery, Stillwater, OK (US); Brian D. O'Dell, Stillwater, OK (US); Andrew C. Teich, West Linn, OR (US); Jeffrey D. Frank, Santa Barbara, CA (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 199 days.

(21) Appl. No.: 14/599,352

(22) Filed: Jan. 16, 2015

(65) Prior Publication Data
US 2015/0172545 A1    Jun. 18, 2015

Related U.S. Application Data

(63) Continuation-in-part of application No. 14/506,430, filed on Oct. 3, 2014, now Pat. No. 9,807,319.
(Continued)

(51) Int. Cl.
*H04N 5/00* (2011.01)
*H04N 5/232* (2006.01)
(Continued)

(52) U.S. Cl.
CPC ........... *H04N 5/23238* (2013.01); *G06T 3/00* (2013.01); *G06T 11/60* (2013.01); *H04N 5/2257* (2013.01);
(Continued)

(58) Field of Classification Search
CPC .... H04N 7/00; H04N 5/23238; H04N 5/2258; H04N 5/33; G03B 37/04; G06T 11/60;
(Continued)

(56) References Cited

U.S. PATENT DOCUMENTS

| | | | |
|---|---|---|---|
| 2,764,055 | A | 9/1956 | Clemens et al. |
| 6,297,794 | B1 | 10/2001 | Tsubouchi et al. |

(Continued)

FOREIGN PATENT DOCUMENTS

| | | |
|---|---|---|
| CA | 2764055 | 7/2012 |
| CN | 2874947 | 2/2007 |

(Continued)

OTHER PUBLICATIONS

Schäfer et al, Ultra high resolution video production and display as basis of a format agnostic production system. In: Proceedings of International Broadcast Conference, IBC 2010 (2010).*

(Continued)

*Primary Examiner* — Frank Huang
(74) *Attorney, Agent, or Firm* — Haynes and Boone, LLP

(57) ABSTRACT

In one embodiment, a method for displaying a panoramic view image includes transmitting video data from a plurality of sensors to a data processor and using the processor to stitch the video data from respective ones of the sensors into a single panoramic image. A focus view of the image is defined and the panoramic image is scrolled such that the focus view is centered in the display. A high resolution camera is aimed along a line corresponding to a center of the focus view of the image and an image produced by the camera is stitched into the panoramic image. A mapping function is applied to the image data to compress the data and thereby reduce at least the horizontal resolution of the image in regions adjacent to the side edges thereof.

20 Claims, 29 Drawing Sheets

Related U.S. Application Data

(60) Provisional application No. 62/059,112, filed on Oct. 2, 2014, provisional application No. 61/928,369, filed on Jan. 16, 2014, provisional application No. 61/886,543, filed on Oct. 3, 2013.

(51) Int. Cl.
| | |
|---|---|
| *G06T 3/00* | (2006.01) |
| *G06T 11/60* | (2006.01) |
| *H04N 5/225* | (2006.01) |
| *H04N 5/33* | (2006.01) |
| *H04N 7/18* | (2006.01) |

(52) U.S. Cl.
CPC ............ *H04N 5/23209* (2013.01); *H04N 5/33* (2013.01); *H04N 5/332* (2013.01); *H04N 7/181* (2013.01)

(58) Field of Classification Search
CPC ....... G06T 7/0022; A61B 3/14; A61B 3/0025; G02B 27/017; G02B 2027/014; G02B 2027/0123; G02B 2027/011; G02B 2027/0138
See application file for complete search history.

(56) References Cited

U.S. PATENT DOCUMENTS

| | | | |
|---|---|---|---|
| 6,330,371 | B1 | 12/2001 | Chen et al. |
| 6,337,683 | B1 | 1/2002 | Gilbert et al. |
| 6,348,951 | B1 | 2/2002 | Kim |
| 6,396,543 | B1 | 5/2002 | Shin et al. |
| 6,424,843 | B1 | 7/2002 | Reitmaa et al. |
| 6,633,231 | B1 | 10/2003 | Okamoto et al. |
| 6,681,120 | B1 | 1/2004 | Kim |
| 6,759,949 | B2 | 7/2004 | Miyahara |
| 6,844,990 | B2 | 1/2005 | Artonne et al. |
| 6,883,054 | B2 | 4/2005 | Yamaguchi et al. |
| 6,911,652 | B2 | 6/2005 | Walkenstein |
| 7,050,107 | B1 | 5/2006 | Frank et al. |
| D524,785 | S | 7/2006 | Huang |
| 7,084,857 | B2 | 8/2006 | Lieberman et al. |
| 7,130,490 | B2 | 10/2006 | Elder et al. |
| 7,208,733 | B2 | 4/2007 | Mian et al. |
| 7,263,379 | B1 | 8/2007 | Parkulo et al. |
| 7,284,921 | B2 | 10/2007 | Lapstun et al. |
| 7,296,747 | B2 | 11/2007 | Rohs |
| 7,305,368 | B2 | 12/2007 | Lieberman et al. |
| 7,321,783 | B2 | 1/2008 | Kim |
| 7,333,832 | B2 | 2/2008 | Tsai et al. |
| 7,377,835 | B2 | 5/2008 | Parkulo et al. |
| 7,420,663 | B2 | 9/2008 | Wang et al. |
| 7,453,064 | B2 | 11/2008 | Lee |
| 7,477,309 | B2 | 1/2009 | Cuccias |
| 7,567,818 | B2 | 7/2009 | Pylkko |
| 7,572,077 | B2 | 8/2009 | Lapstun et al. |
| 7,575,077 | B2 | 8/2009 | Priepke et al. |
| 7,595,904 | B2 | 9/2009 | Lapstun et al. |
| 7,616,877 | B2 | 11/2009 | Zarnowski et al. |
| 7,620,265 | B1 | 11/2009 | Wolff et al. |
| 7,627,364 | B2 | 12/2009 | Sato |
| 7,697,962 | B2 | 4/2010 | Cradick et al. |
| 7,723,686 | B2 | 5/2010 | Hannebauer |
| 7,725,141 | B2 | 5/2010 | Su |
| 7,728,281 | B2 | 6/2010 | Chen |
| 7,733,371 | B1 | 6/2010 | Monroe |
| 7,735,974 | B2 | 6/2010 | Silverbrook et al. |
| 7,747,454 | B2 | 6/2010 | Bartfeld et al. |
| 7,760,919 | B2 | 7/2010 | Namgoong |
| 7,761,114 | B2 | 7/2010 | Silverbrook et al. |
| 7,773,870 | B2 | 8/2010 | Naruse |
| 7,801,733 | B2 | 9/2010 | Lee et al. |
| 7,810,733 | B2 | 10/2010 | Silverbrook et al. |
| 7,872,574 | B2 | 1/2011 | Betts et al. |
| 7,900,842 | B2 | 3/2011 | Silverbrook et al. |
| 7,903,152 | B2 | 3/2011 | Kim |
| 7,947,222 | B2 | 5/2011 | Bae et al. |
| 7,960,700 | B2 | 6/2011 | Craig et al. |
| 8,275,413 | B1 | 9/2012 | Fraden et al. |
| 8,305,424 | B2 | 11/2012 | Inaguma |
| 8,305,577 | B2 | 11/2012 | Kivioja et al. |
| 8,345,226 | B2 | 1/2013 | Zhang |
| 8,537,343 | B2 | 9/2013 | Zhang |
| 8,781,420 | B2 | 7/2014 | Schlub et al. |
| 8,825,112 | B1 | 9/2014 | Fraden et al. |
| 2002/0006337 | A1 | 1/2002 | Kimura et al. |
| 2002/0058352 | A1 | 5/2002 | Jacksen et al. |
| 2002/0122036 | A1 | 9/2002 | Sasaki |
| 2002/0135571 | A1 | 9/2002 | Klocek et al. |
| 2002/0140542 | A1 | 10/2002 | Prokoski et al. |
| 2002/0149600 | A1 | 10/2002 | Van Splunter et al. |
| 2003/0007193 | A1 | 1/2003 | Sato et al. |
| 2003/0112871 | A1 | 6/2003 | Demos |
| 2003/0122957 | A1 | 7/2003 | Emme |
| 2003/0223623 | A1 | 12/2003 | Gutta et al. |
| 2004/0047518 | A1 | 3/2004 | Tiana |
| 2004/0101298 | A1 | 5/2004 | Mandelbaum et al. |
| 2004/0127156 | A1 | 7/2004 | Park |
| 2004/0128070 | A1 | 7/2004 | Schmidt et al. |
| 2004/0157612 | A1 | 8/2004 | Kim |
| 2004/0165788 | A1 | 8/2004 | Perez et al. |
| 2004/0169860 | A1 | 9/2004 | Jung et al. |
| 2004/0207036 | A1 | 10/2004 | Ikeda |
| 2004/0256561 | A1 | 12/2004 | Beuhler et al. |
| 2005/0030314 | A1 | 2/2005 | Dawson |
| 2005/0067852 | A1 | 3/2005 | Jeong |
| 2005/0089241 | A1 | 4/2005 | Kawanishi et al. |
| 2005/0068333 | A1 | 5/2005 | Nakahashi et al. |
| 2005/0093890 | A1 | 5/2005 | Baudisch |
| 2005/0110803 | A1 | 5/2005 | Sugimura |
| 2005/0138569 | A1 | 6/2005 | Baxter et al. |
| 2005/0169655 | A1 | 8/2005 | Koyama et al. |
| 2005/0184993 | A1 | 8/2005 | Ludwin et al. |
| 2005/0213813 | A1 | 9/2005 | Lin et al. |
| 2005/0213853 | A1 | 9/2005 | Maier et al. |
| 2005/0219249 | A1 | 10/2005 | Xie et al. |
| 2005/0248912 | A1 | 11/2005 | Kang et al. |
| 2005/0265688 | A1 | 12/2005 | Kobayashi |
| 2005/0270784 | A1 | 12/2005 | Hahn et al. |
| 2005/0277447 | A1 | 12/2005 | Buil et al. |
| 2006/0039686 | A1 | 2/2006 | Soh et al. |
| 2006/0060984 | A1 | 3/2006 | Wakabayashi et al. |
| 2006/0077246 | A1 | 4/2006 | Kawakami et al. |
| 2006/0097172 | A1 | 5/2006 | Park |
| 2006/0120712 | A1 | 6/2006 | Kim |
| 2006/0132642 | A1 | 6/2006 | Hosaka et al. |
| 2006/0140501 | A1 | 6/2006 | Tadas |
| 2006/0147191 | A1 | 7/2006 | Kim |
| 2006/0154559 | A1 | 7/2006 | Yoshida |
| 2006/0210249 | A1 | 9/2006 | Seto |
| 2006/0234744 | A1 | 10/2006 | Sung et al. |
| 2006/0240867 | A1 | 10/2006 | Wang et al. |
| 2006/0279758 | A1 | 12/2006 | Myoki |
| 2006/0285907 | A1 | 12/2006 | Kang et al. |
| 2007/0004449 | A1 | 1/2007 | Sham |
| 2007/0019077 | A1 | 1/2007 | Park |
| 2007/0019099 | A1 | 1/2007 | Lieberman et al. |
| 2007/0019103 | A1 | 1/2007 | Lieberman et al. |
| 2007/0033309 | A1 | 2/2007 | Kuwabara et al. |
| 2007/0034800 | A1 | 2/2007 | Huang |
| 2007/0052616 | A1 | 3/2007 | Yoon |
| 2007/0057764 | A1 | 3/2007 | Sato et al. |
| 2007/0103479 | A1 | 5/2007 | Kim et al. |
| 2007/0120879 | A1 | 5/2007 | Kanade et al. |
| 2007/0132858 | A1 | 6/2007 | Chiba et al. |
| 2007/0139739 | A1 | 6/2007 | Kim et al. |
| 2007/0159524 | A1 | 7/2007 | Kim et al. |
| 2007/0189583 | A1 | 8/2007 | Shimada et al. |
| 2007/0211965 | A1 | 9/2007 | Helbing et al. |
| 2007/0222798 | A1 | 9/2007 | Kuno |
| 2007/0248284 | A1 | 10/2007 | Bernsen et al. |
| 2007/0274541 | A1 | 11/2007 | Uetake et al. |
| 2007/0285439 | A1 | 12/2007 | King et al. |

(56) References Cited

U.S. PATENT DOCUMENTS

| | | |
|---|---|---|
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0143820 A1* | 6/2008 | Peterson ............... G06T 3/4038 348/36 |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0259181 A1 | 10/2008 | Yamashita et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2009/0303363 A1 | 12/2009 | Blessinger |
| 2010/0020229 A1 | 1/2010 | Hershey et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2011/0234750 A1* | 9/2011 | Lai ........................ G03B 37/04 348/37 |
| 2012/0007987 A1 | 1/2012 | Gaber |
| 2012/0083314 A1 | 4/2012 | Ng et al. |
| 2012/0169842 A1 | 7/2012 | Chuang et al. |
| 2012/0184252 A1 | 7/2012 | Hirsch |
| 2012/0200665 A1 | 8/2012 | Furumura et al. |
| 2012/0242788 A1 | 9/2012 | Chuang et al. |
| 2012/0249957 A1* | 10/2012 | Shibata ............... A61L 33/0025 351/206 |
| 2012/0257005 A1* | 10/2012 | Browne ............... G02B 27/017 348/36 |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0182066 A1* | 7/2013 | Ishimoto ............... H04N 7/181 348/38 |
| 2013/0204570 A1 | 8/2013 | Mendelson et al. |
| 2013/0320220 A1 | 12/2013 | Donowsky |
| 2016/0241892 A1* | 8/2016 | Cole .................... H04N 19/136 |

FOREIGN PATENT DOCUMENTS

| | | |
|---|---|---|
| CN | 2899321 | 5/2007 |
| CN | 101055494 | 10/2007 |
| CN | 101262597 | 9/2008 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 0 973 137 | 1/2000 |
| EP | 1 983 485 | 10/2008 |
| EP | 2 136 554 | 12/2009 |
| EP | 2477391 | 7/2012 |
| JP | 1997275518 | 4/1999 |
| JP | 2004 004465 | 1/2004 |
| JP | 2004048571 | 2/2004 |
| JP | 2004 241491 | 8/2004 |
| JP | 2006098098 | 4/2006 |
| JP | 2006105655 | 4/2006 |
| JP | 2007006475 | 1/2007 |
| JP | 2007 267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |

(56) References Cited

FOREIGN PATENT DOCUMENTS

| | | |
|---|---|---|
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 20060054877 | 5/2006 |
| KR | 20060071220 | 6/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 00/23814 | 4/2000 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |

(56) References Cited

OTHER PUBLICATIONS

Thomas, et al "Combining Panoramic Image and 3D Audio Capture With Conventional Coverage for Immersive and Interactive Content Production, " IBC 2011.*

Reingold; Gaze-Contingent Multiresolutional Displays: An Integrative Review; Hum Factors. 2003 Summer;45(2):307-28.*

Gangkofner et al., "Optimizing the High-Pass Filter Addition Technique for Image Fusion", Photogrammetric Engineering & Remote Sensing, Sep. 2008, pp. 1107-1118, vol. 74, No. 9. In particular section titiled "Short Overview of Existing Image Fusion Approaches", and "Previous Findings with Regard to HPFA Parameters". American Society for Photogrammetry and Remote Sensing, Bethesda, MD.

Ager et al., Geopositional accuracy evaluation of QuickBird ortho-ready standard 2A multispectral imagery, Algorithms and Technologies for Multispectral, Hyperspectral, and Ultraspectral Imagery X, Aug. 12, 2004, pp. 488-499, vol. 5425, Proceedings of SPIE, Bellingham WA.

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

* cited by examiner

SITUATIONAL AWARENESS BY COMPRESSED DISPLAY OF PANORAMIC VIEWS

CROSS-REFERENCE TO RELATED APPLICATIONS

This application claims the benefit of and priority to U.S. Provisional Patent Application No. 62/059,112 filed Oct. 2, 2014 and entitled "SITUATIONAL AWARENESS BY COMPRESSED DISPLAY OF PANORAMIC VIEWS," the entire disclosure of which is incorporated herein by reference.

This patent application is a continuation-in-part of U.S. Utility patent application Ser. No. 14/506,430, filed Oct. 3, 2014 and entitled "WEARABLE IMAGING DEVICES, SYSTEMS, AND METHODS," which claims priority to and benefit of U.S. Provisional Patent Application No. 61/886,543 filed Oct. 3, 2013 and entitled "WEARABLE IMAGING DEVICES, SYSTEMS, AND METHODS," the entire disclosure of each of which is incorporated herein by reference.

This application claims the benefit of and priority to U.S. Provisional Patent Application No. 61/928,369 filed Jan. 16, 2014 and entitled "WEARABLE APPARATUS WITH INTEGRATED INFRARED IMAGING MODULE," the entire disclosure of which is incorporated herein by reference.

TECHNICAL FIELD

One or more embodiments of the invention relate generally to systems and methods for displaying images and, more particularly, displaying panoramic images with gradient compression.

BACKGROUND

Display systems are often used to display panoramic images that extend beyond the field of view of a human user. For example, imaging and display systems are often used to increase the user's awareness of their surroundings by displaying a panoramic image of the user's surroundings using images captured at multiple or wide angles around the user. In another example, virtual image displays such as video gaming systems often provide a panoramic view of a virtual scene to a user.

When displaying panoramic images to a user, a full 360 degree panoramic image is desirable. However, it can be difficult to display a full 360 degree field of view to a human user without overly distorting the image and/or providing the image in a way that is confusing or overly complicated for the user to comprehend. This can be particularly disadvantageous in dangerous situations such as combat situations or firefighting situations when the user is already receiving large amounts of stimuli under stressful conditions.

Conventional 360 degree panoramic image displays typically use a very large display to accommodate a full resolution view of all of the image data or use a highly distorting fish eye view to compress the image data for display. Large displays can be unwieldy, heavy, and expensive and the user's awareness can be reduced with a simple large display image because the human eye cannot take in the entire display at once (e.g., the image display exceeds the visual range of the human eye). Overly distorted views such as fish-eye displays can cause fatigue, disorientation and difficulties with zooming and tracking of displayed objects.

Thus, there is a need in the art for comprehensible panoramic image displays.

SUMMARY

Various embodiments are disclosed for image display systems such as virtual image display systems, other generated or received image display systems, and/or imaging and display systems that may include image capturing components and a display. Image capturing components may include visible light imagers and/or infrared imagers such as thermal imagers.

In various embodiments, display systems and methods are provided for enhancing human situational awareness. In a manner similar to that in which the human eye and brain see surroundings, an expanded or panoramic field of view (FoV), up to and including a 360 degree panoramic view, can be displayed, wherein a highest resolution portion of the panoramic view is provided in a central or foveal field of acute focus of the display, whereas, areas adjacent to this field, e.g., far peripheral vision areas, mid-peripheral vision areas, and near-peripheral vision areas are displayed with a reduced resolution. For example, the peripheral vision areas outside of the central field of view may be compressed in resolution without spatially distorting the image. The compression of the peripheral areas may increase with increasing distance from the central field of view in one of various gradient compression schemes.

In another embodiment, a method for displaying a panoramic view image comprises transmitting video data from a plurality of sensors to a data processor and using the processor to stitch the video data from respective ones of the sensors into a single panoramic image. A focus view of the image is defined and the panoramic image is scrolled such that the focus view is centered in the display. A high resolution camera is aimed along a line corresponding to a center of the focus view of the image and an image produced by the camera is stitched into the panoramic image. A mapping function is applied to the image data to compress the data and thereby reduce at least the horizontal resolution of the image in regions adjacent to the side edges thereof.

In some embodiments, image display systems may be incorporated into wearable imaging systems. A wearable imaging system may be a wearable thermal imaging system and/or a wearable imaging device such as a wearable multisensor array having multiple infrared imaging modules and/or non-thermal imaging modules, each with a field of view that includes a portion of a scene. The infrared imaging modules and/or non-thermal imaging modules may be mounted on a wearable structure such as a helmet structure or a wearable apparatus having a shield. The wearable imaging device may include an infrared imaging module and a display to present one or more user-viewable thermal images such as panoramic thermal images of an external environment to the wearer. The wearable structure may be formed from rigid materials that protect the wearer from impacts. The wearable structure may be partially or completely covered with a patterned material such as a painted pattern or a patterned fabric.

Thermal images captured using the infrared imaging modules and/or non-thermal images captured by using the non-thermal imaging modules may be displayed to a wearer using a display in the wearable imaging device. The display may be an opaque display, a pico-projector display, a retina projector, or other display device for presenting thermal and/or non-thermal images such as panoramic images to the wearer.

In one embodiment, the wearable imaging device may be implemented as a multidirectional threat monitoring helmet that may be worn by military personnel, law enforcement personnel, hunters or others who desire to be alerted to the presence and location of a living being in their vicinity. For example, a soldier on patrol at night may wish to view panoramic images of their surroundings and/or be alerted to the presence and location of an enemy combatant approaching from a particular direction. A multidirectional threat monitoring helmet may be used to display a forward-looking thermal image of the environment in front of the wearer and various thermal images of other portions of the wearer's environment. A multidirectional threat monitoring helmet may be used to display a panoramic image including a high resolution portion showing a forward-looking portion of the environment in front of the wearer and smoothly continuous, gradient-compressed peripheral portions of the image of the wearer's environment surrounding the high resolution portion. A multidirectional threat monitoring helmet may be used to thermally detect the enemy combatant using one or more infrared imaging modules on the helmet and to alert the wearer of the helmet to the presence and location of the enemy combatant.

In another embodiment, a self-contained breathing apparatus (SCBA) may include a shield to protect a user from an external environment, one or more infrared imaging modules, a projector, a processor, and a communication module for projecting a user-viewable thermal image onto a surface of the shield. Such infrared imaging modules may be positioned internal to the SCBA so that they are also protected from the external environment, such as a hazardous environment. The infrared imaging modules may be arranged to capture images in multiple directions around the wearer of the SCBA. The projector may be used to project a forward-looking thermal image of the environment in front of the wearer and various thermal images of other portions of the wearer's environment onto a portion of the shield. The projector may be used to project a panoramic image including a high resolution portion showing a forward-looking portion of the environment in front of the wearer and smoothly continuous, gradient-compressed peripheral portions of the image of the wearer's environment surrounding the high resolution portion onto a portion of the shield.

In one embodiment, a wearable apparatus includes a shield configured to protect at least a portion of a user's face from an external environment; an infrared imaging module comprising a focal plane array (FPA) configured to capture a thermal image of the external environment; a processor configured to convert the thermal image into a user-viewable image of the external environment; and a projector configured to project one or more user-viewable images onto an inner surface of the shield for viewing by the user while wearing the apparatus.

In another embodiment, a method of operating a wearable apparatus includes capturing, at a focal plane array (FPA) of an infrared imaging module of the wearable apparatus, a thermal image of an external environment; converting the thermal image into a user-viewable image of the external environment; and projecting the user-viewable image onto an inner surface of a shield of the wearable apparatus for viewing by the user, wherein the shield protects at least a portion of the user's face while the wearable apparatus is worn by the user.

In another embodiment, a method of constructing a wearable apparatus includes providing a shield for protecting at least a portion of a user's face from an external environment; positioning an infrared imaging module relative to the shield, wherein the infrared imaging module comprises a focal plane array (FPA) configured to capture a thermal image of the external environment while the apparatus is worn by the user; positioning a projector relative to the shield, wherein the projector is configured to project a user-viewable image of the external environment onto an inner surface of the shield for viewing by the user while wearing the apparatus; and communicatively coupling a processor with the infrared imaging module and the projector.

In various embodiments, a user-viewable image of the external environment may include a panoramic image having a high resolution central portion corresponding to a forward facing portion of a scene and surrounding, gradient-compressed peripheral portions that display up to and including a 360 degree view of the user's surroundings.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
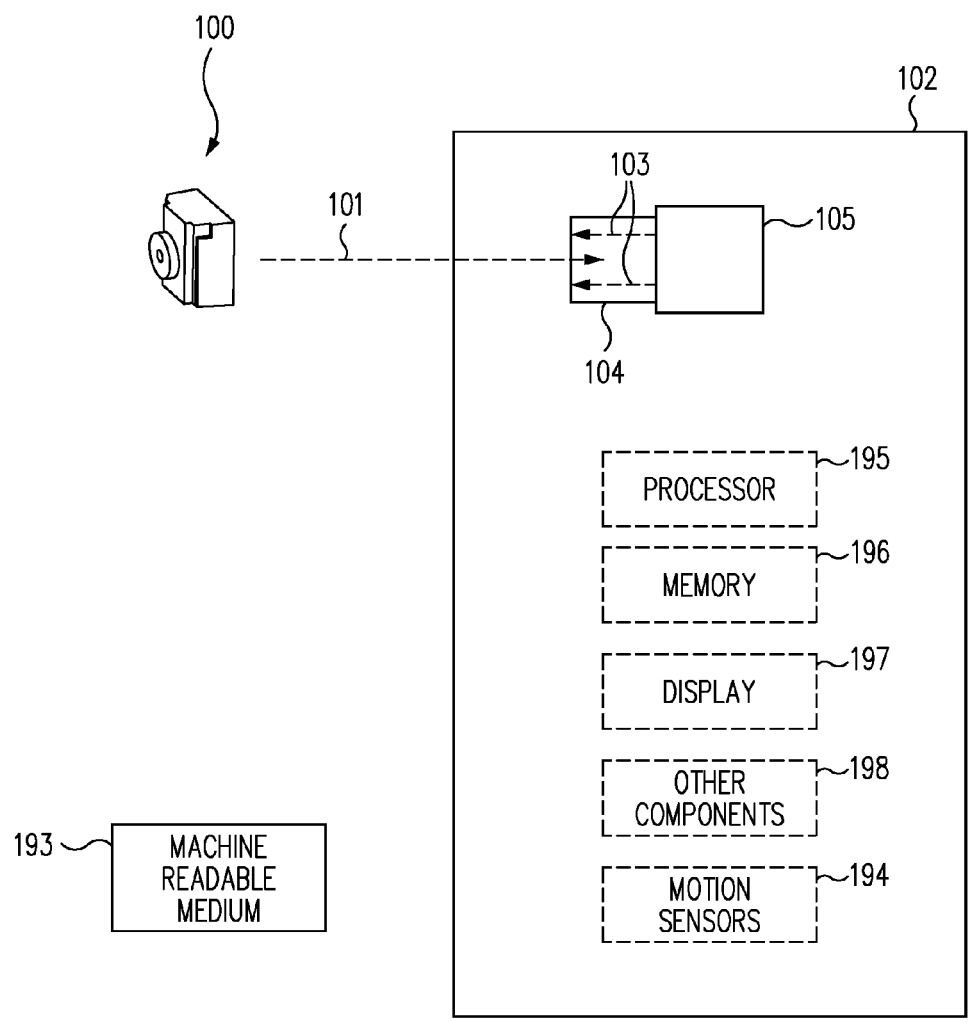
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, a self-contained breathing apparatus (SCBA), a helmet, another wearable imaging device, or any other appropriate mobile device or in one or more cameras of a fixed imaging installation such as a surveillance system. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self-heating in comparison with other types of infrared imaging devices. As a result, infrared imaging module 100 may be operated with reduced measures to compensate for such self-heating.

Figure 2:
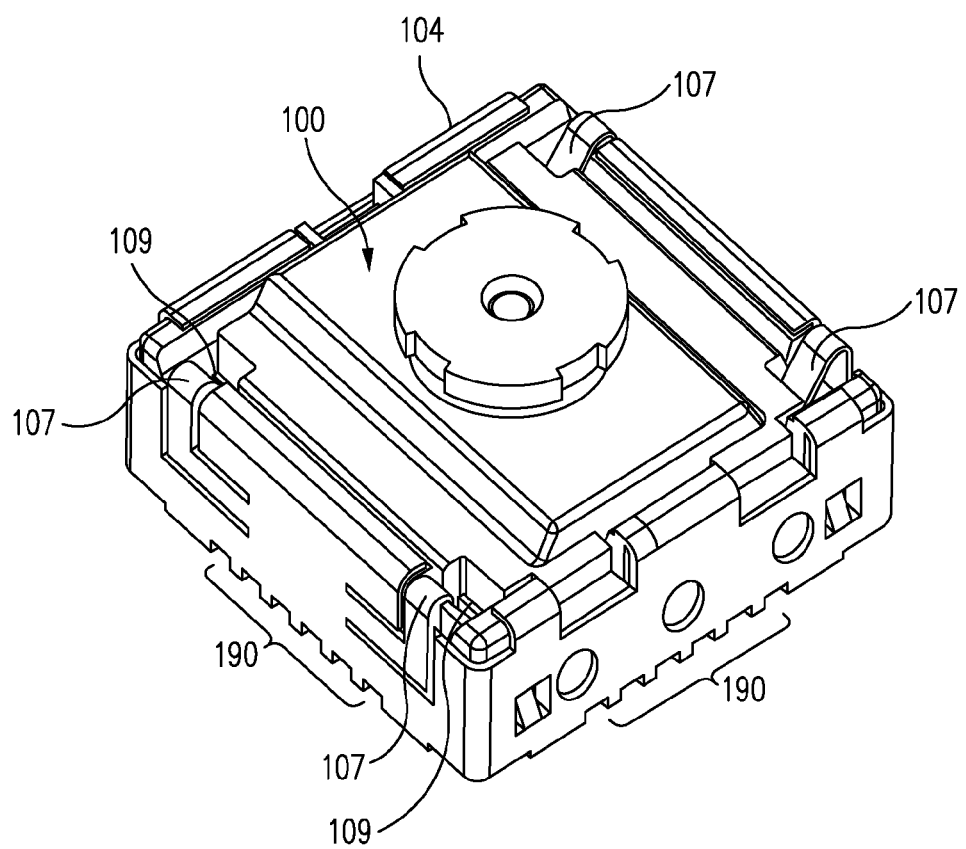
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
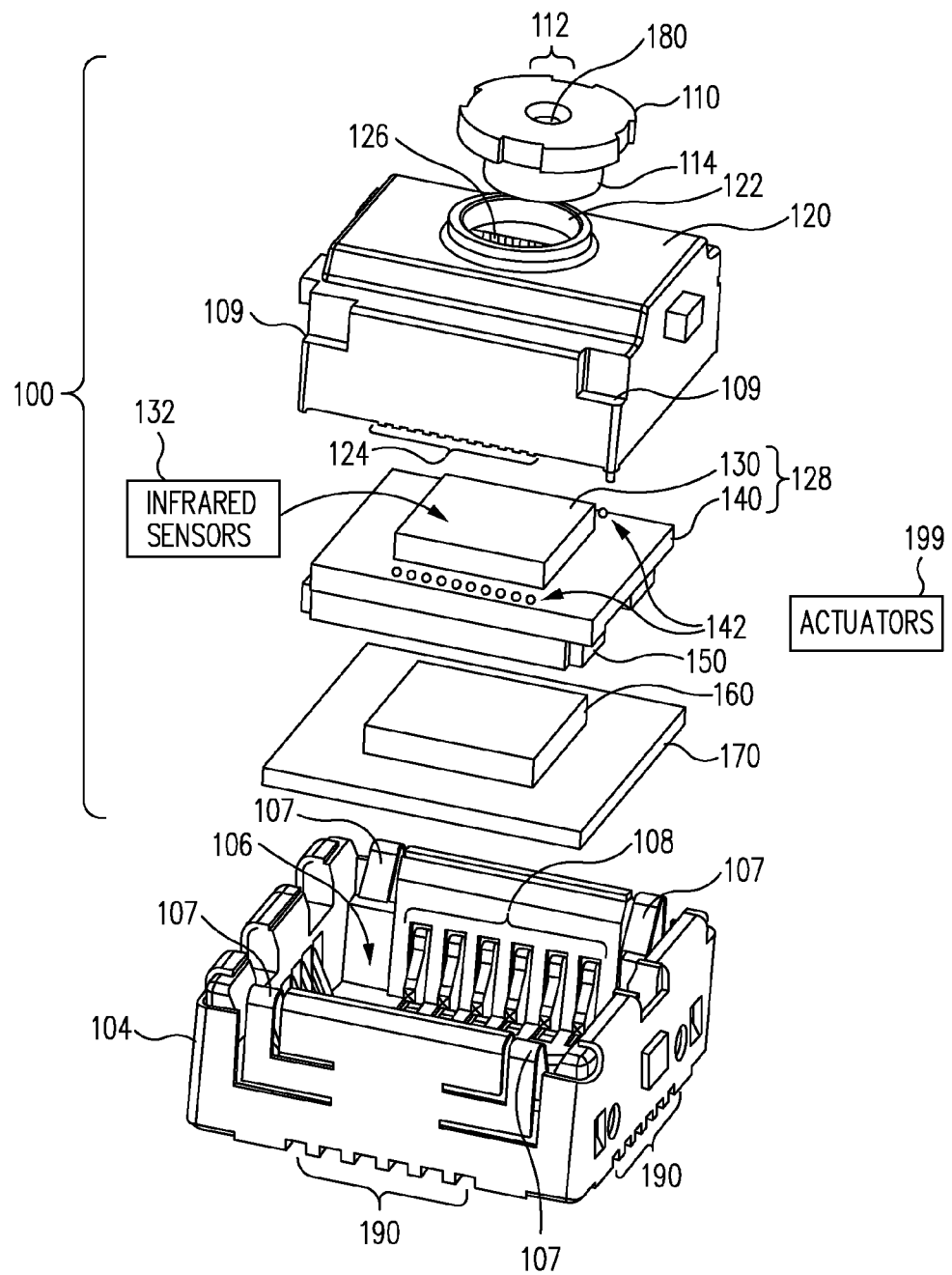
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g, infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid-wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIG. 3. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
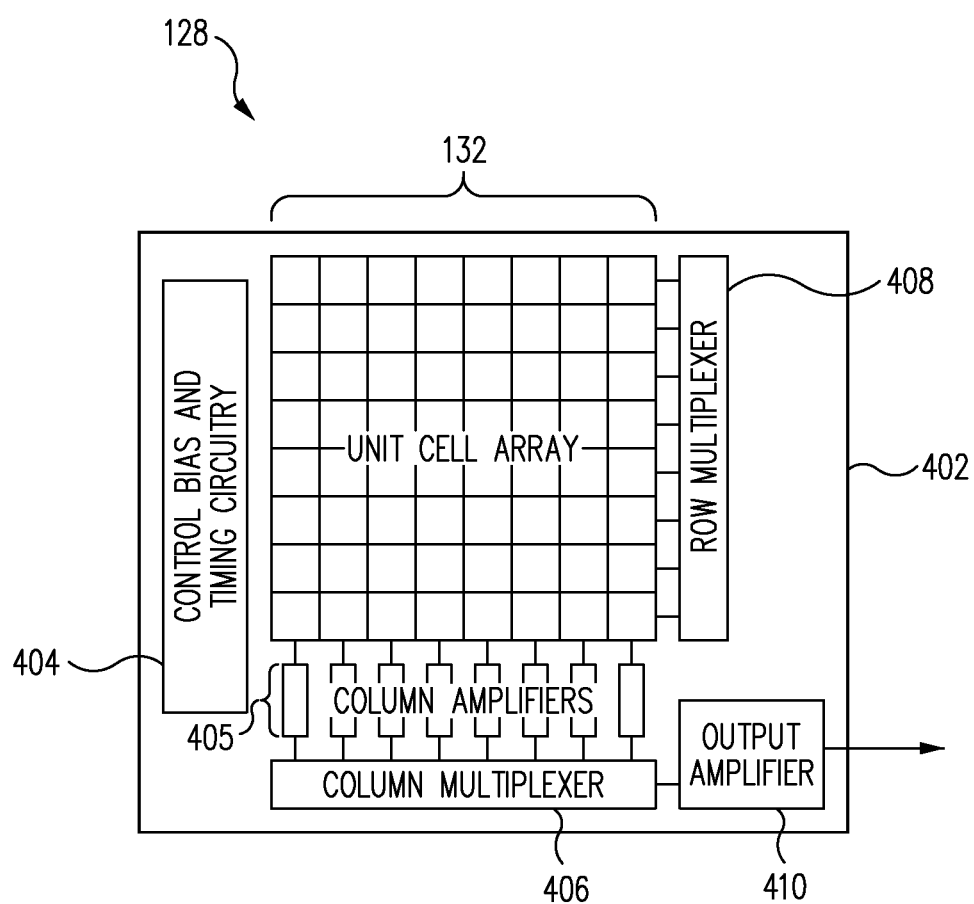
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as, for example, zinc, aluminum, or magnesium, as desired for a given application and may be formed by any desired applicable process, such as, for example, aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic materials.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a Non-Uniformity Correction (NUC) calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
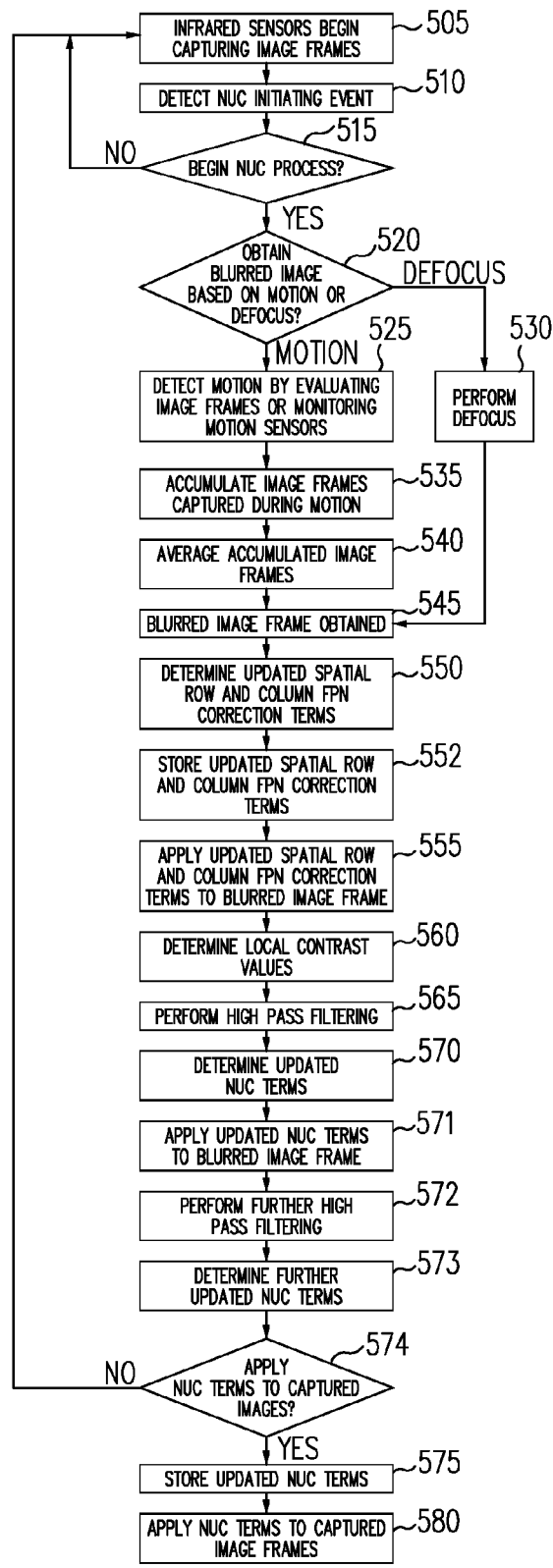
FIG. 5 illustrates a flow diagram of various operations to determine non-uniformity correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is detected (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, fixed pattern noise (FPN) (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
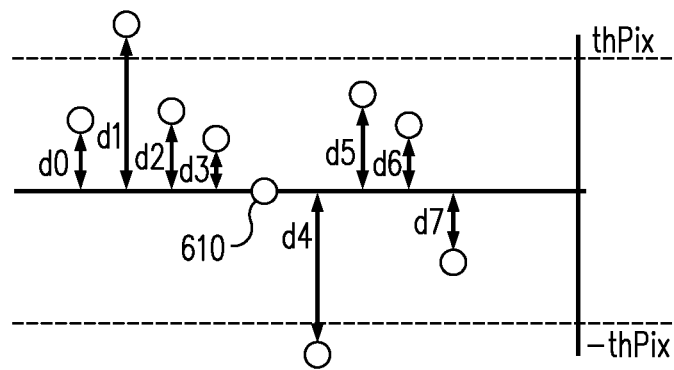
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
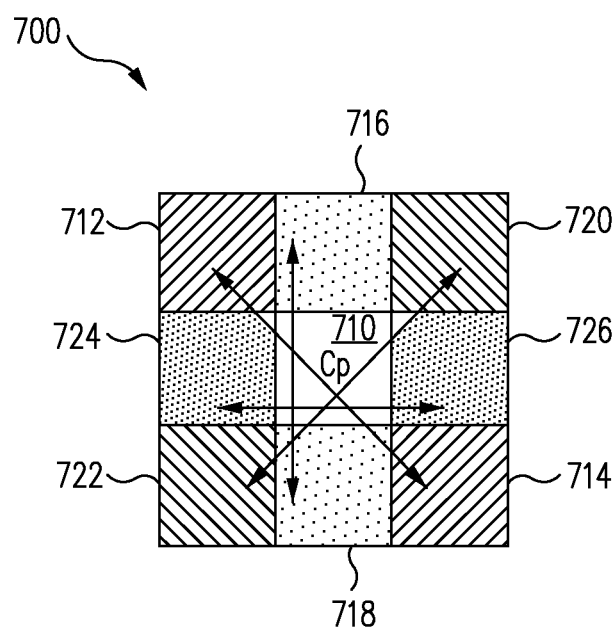
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor λ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW}=\lambda \cdot NUC_{OLD}+(1-\lambda)\cdot(NUC_{OLD}+NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
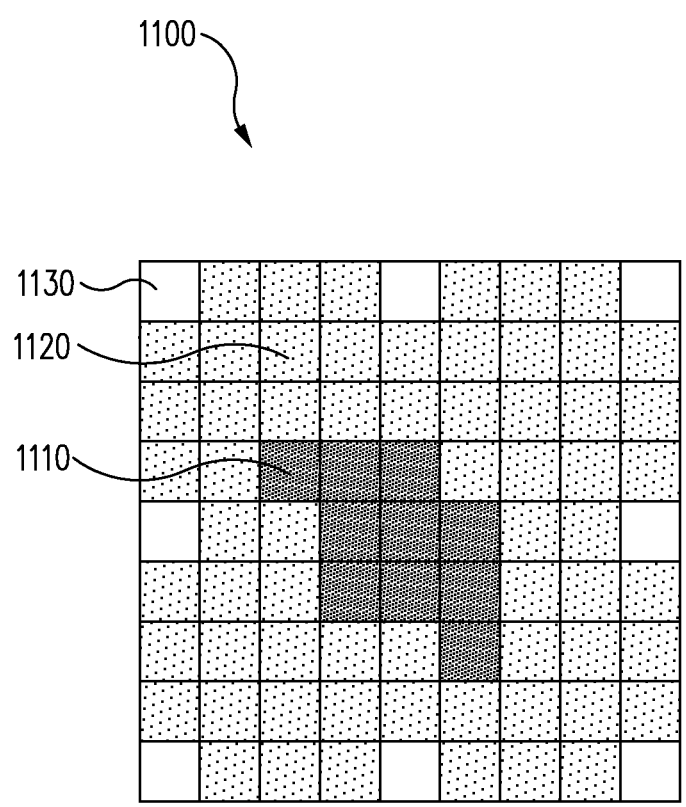
FIG. 11 illustrates spatially correlated fixed pattern noise (FPN) in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
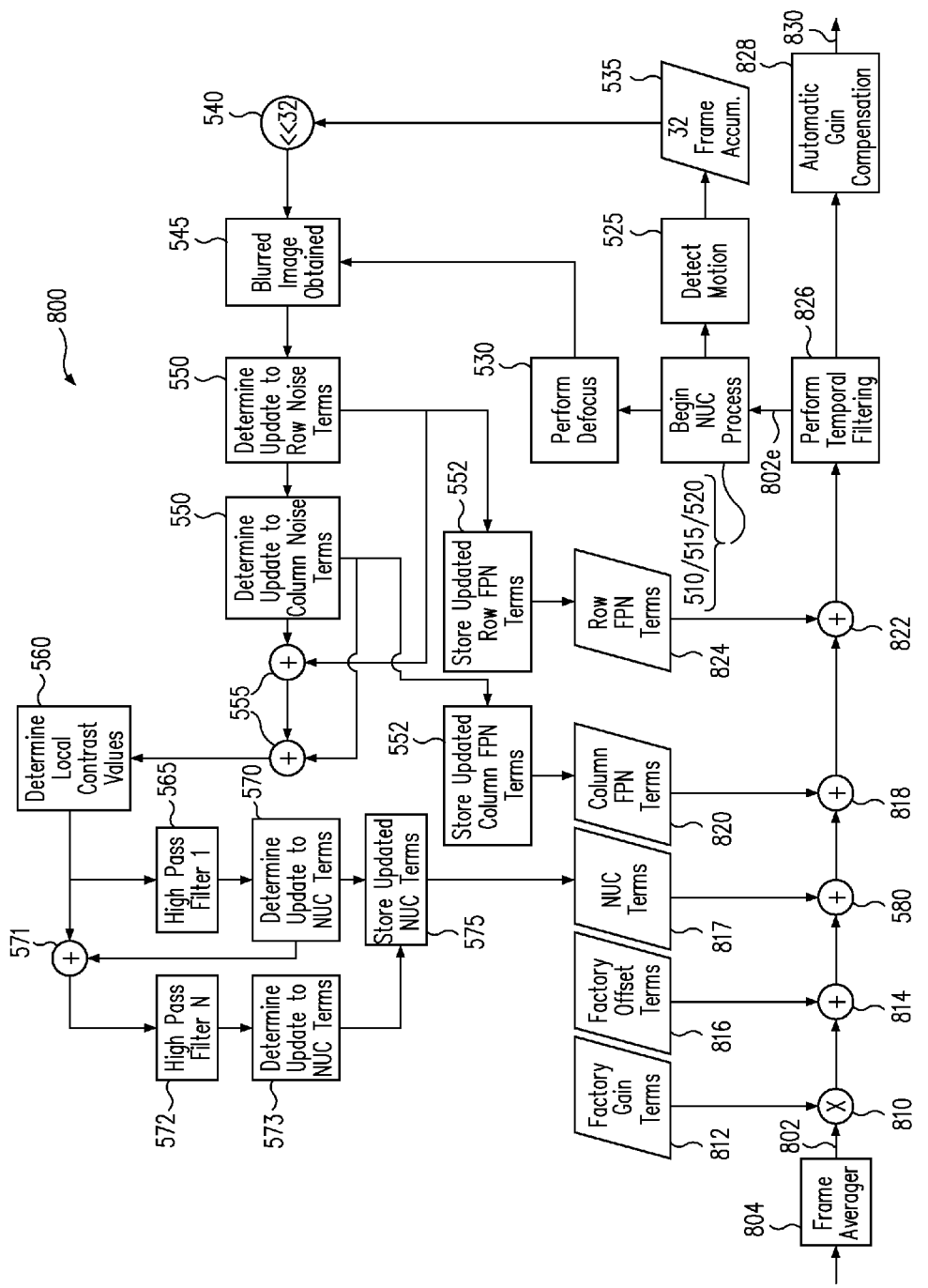
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
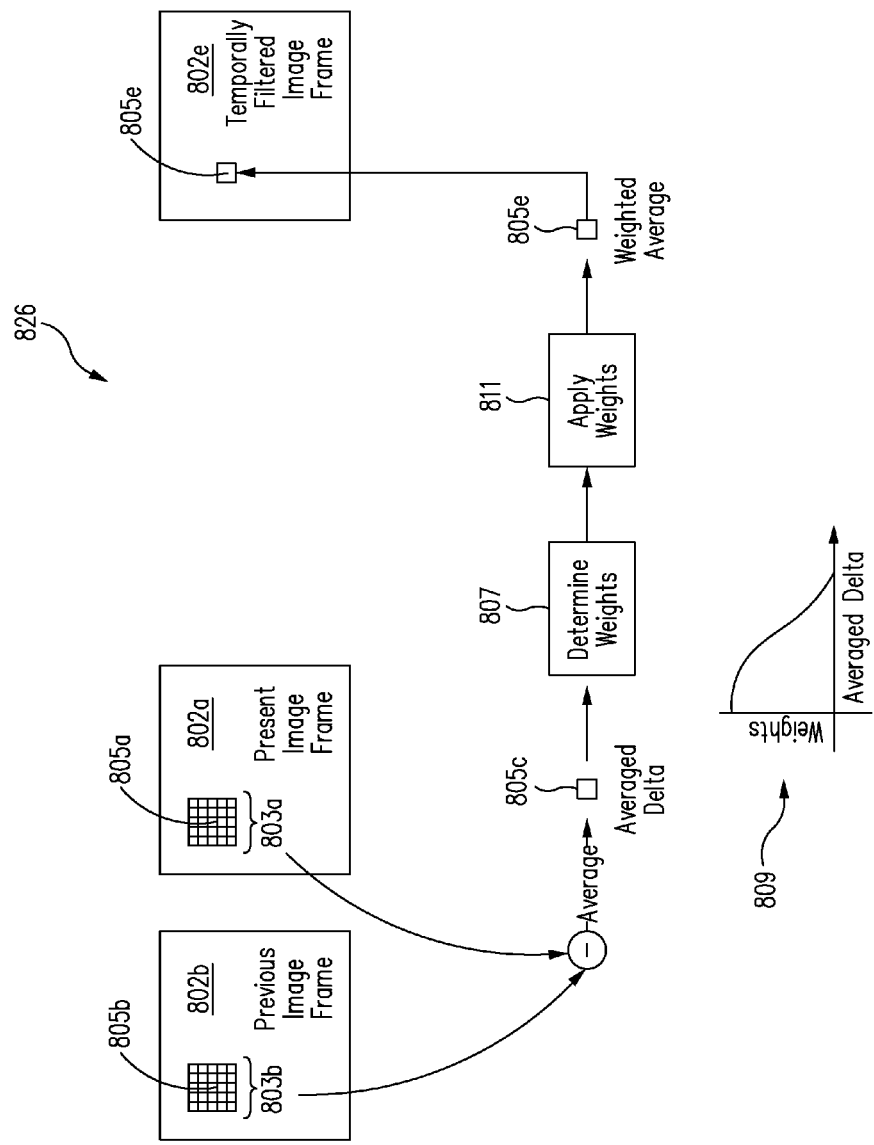
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
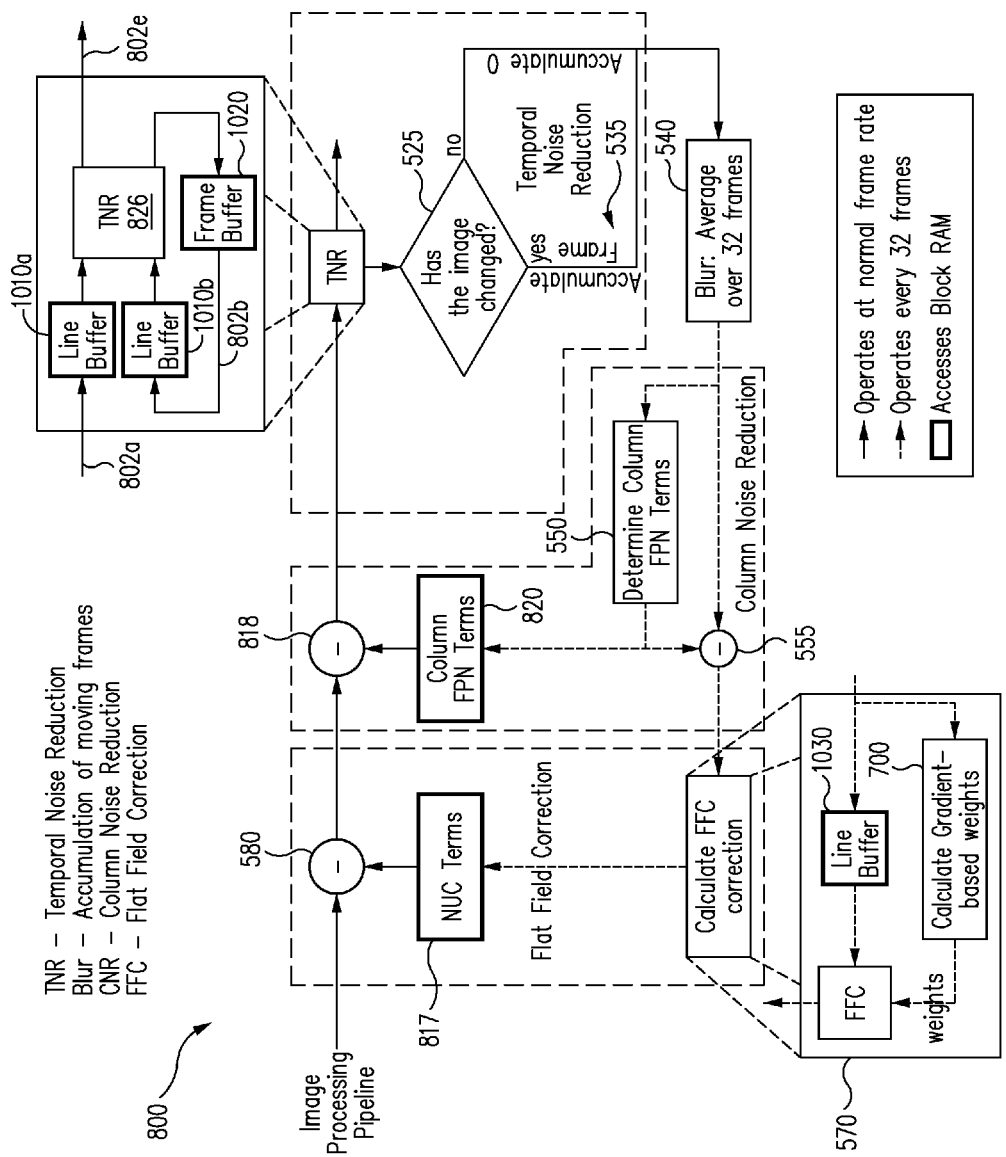
FIG. 10 illustrates particular implementation details of several processes of the image processing pipeline of FIG. 8 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is $\frac{1}{32}$ of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged.

This can improve the accuracy and effectiveness of noise correction terms determined in accordance with the various described techniques.

In some embodiments, infrared imaging module 100 may be configured to operate at low voltage levels. In particular, infrared imaging module 100 may be implemented with circuitry configured to operate at low power and/or in accordance with other parameters that permit infrared imaging module 100 to be conveniently and effectively implemented in various types of host devices 102, such as mobile devices and other devices.

For example, infrared imaging module 100 may include a low dropout regulator (LDO) (e.g., on the same chip and/or wafer level package as the ROIC). For example, an LDO may be provided as part of an FPA with infrared sensor assembly 128. As discussed, such implementations may reduce power supply noise introduced to infrared sensor assembly 128 and thus provide an improved power supply rejection ratio (PSRR). In addition, by implementing the LDO with the ROIC, less die area may be consumed and fewer discrete die (or chips) are needed. Also, in some embodiments, the use of an LDO may reduce or eliminate the need for a separate negative reference voltage to be provided to infrared sensor assembly 128.

Figure 12:
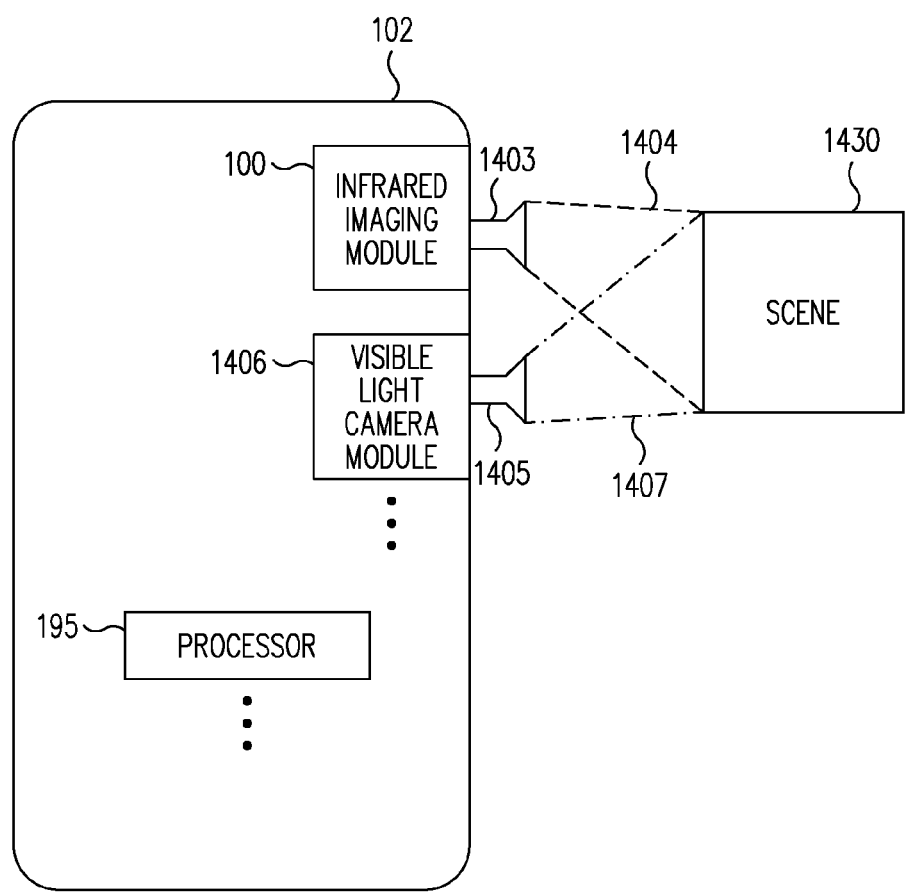
FIG. 12 illustrates a block diagram of a host system having an infrared imaging module and a visible light camera in accordance with an embodiment of the disclosure.

Referring now to FIG. 12, a block diagram is shown of another implementation of host system 102 showing how system 102 may include one or more non-thermal imaging modules such as visible light camera module 1406 in addition to one or more infrared imaging modules such as infrared imaging module 100 in accordance with an embodiment of the disclosure. System 102 may be used to image and/or monitor a real-world scene such as scene 1430.

System 102 may include one or more infrared imaging modules 100, one or more visible light cameras 1406, and additional components as described above in connection with FIG. 1 (e.g., processor 195, memory 196, display 197, one or more motion sensors 194, and/or other components 198 such as a control panel, alert components, or communications components). In various embodiments, components of system 102 of FIG. 12 may be implemented in the same or similar manner as corresponding components of host device 102 of FIG. 1. Moreover, components of system 102 may be configured to perform various NUC processes and other processes described herein.

As shown in FIG. 12, in some embodiments, infrared imaging module 100 may include various optical elements 1403 (e.g., one or more infrared-transmissive lens, one or more infrared-transmissive prisms, one or more infrared-reflective mirrors, or one or more infrared fiber optic elements) that guide infrared radiation from scene 1430 to an FPA of infrared imaging module 100. In some embodiments, optical elements 1403 may be used to suitably define or alter FoV 1404 of infrared imaging module 100. A switchable FoV (e.g., selectable by infrared imaging module 100 and/or processor 195) may optionally be provided, which may be useful when, for example, a selective close-up view of a portion of scene 1430 is desired.

Optical elements 1403 may also include one or more filters adapted to pass infrared radiation of some wavelengths but substantially block infrared radiation of other wavelengths (e.g., short-wave infrared (SWIR) filters, mid-wave infrared (MWIR) filters, long-wave infrared (LWIR) filters, and narrow-band filters). Such filters may be utilized to tailor infrared imaging module 100 for increased sensitivity to a desired band of infrared wavelengths. For example, in some situations, it may be desirable to detect exhaled breaths of a person or an animal. In this type of situation, a better result may be achieved by utilizing a narrow-band filter that transmits only in the wavelengths matching a specific absorption/emission spectrum of carbon dioxide ($CO_2$) or other constituent gases of an exhaled breath. In some embodiments, filters may be selectable (e.g., provided as a selectable filter wheel). In other embodiments, filters may be fixed as appropriate for a desired application of system 102.

Visible light camera 1406 may be a small form factor non-thermal imaging module or imaging device, and may be implemented in a similar manner as various embodiments of infrared imaging module 100 disclosed herein, but with one or more sensors responsive to non-thermal radiation (e.g., radiation in the visible, near infrared, short-wave infrared or other non-thermal portion of the electromagnetic spectrum). For example, in some embodiments, visible light camera 1406 may be implemented with a charge-coupled device (CCD) sensor, an electron multiplying CCD (EMCCD) sensor, a complementary metal-oxide-semiconductor (CMOS) sensor, a scientific CMOS (sCMOS) sensor, an intensified charge-coupled device (ICCD), or other sensors.

As shown in FIG. 12, in some embodiments, visible light camera module 1406 may include various optical elements 1405 (e.g., one or more lenses, one or more color filters, one or more prisms, one or more mirrors, or one or more fiber optic elements) that guide non-thermal radiation from scene 1430 to visible light camera module 1406. In some embodiments, optical elements 1405 may be used to suitably define or alter FoV 1407 of visible light camera module 1406. A switchable FoV (e.g., selectable by visible light camera module 1406 and/or processor 195) may optionally be provided, which may be useful when, for example, a selective close-up view of a portion of scene 1430 is desired. If desired, elements 1403 and 1405 may be operable to alternately switch between an infrared imaging mode and a visible light imaging mode for system 102.

Optical elements 1405 may also include one or more filters adapted to pass radiation of some wavelengths (colors) but substantially block radiation of other wavelengths (e.g., red color filters, blue color filters, green color filters, near-infrared color filters, short-wave infrared filters, and narrow-band filters). In some embodiments, filters of elements 1405 may be selectable (e.g., provided as a selectable filter wheel). In other embodiments, filters of element 1405 may be fixed as appropriate for a desired application of system 102. Although camera module 1406 is sometimes referred to herein as a visible light camera module as an example, it should be appreciated that camera module 1406 may be any suitable non-thermal camera module as described herein that generates images in response to incoming light having any suitable corresponding range of non-thermal wavelengths (e.g., visible light wavelengths, near infrared wavelengths, short-wave infrared wavelengths or other wavelengths that are relatively shorter than thermal infrared wavelengths).

In some embodiments, non-thermal images such as visible light images captured by visible light camera 1406 may be received by processor 195, which may be configured to fuse, superimpose, or otherwise combine the visible light images with the thermal images captured by infrared imaging module 100 as further described herein. Processor 195 may be configured to generate panoramic visible images, panoramic thermal images, and/or panoramic thermal and non-thermal images (e.g., panoramic thermal images having high contrast visible light image features fused with the thermal images) in which the panoramic images include a central high resolution portion and gradient compressed peripheral portions.

In some embodiments, visible light camera 1406 may be co-located with infrared imaging module 100 in a housing structure and oriented so that FoV 1407 of visible light camera 1406 at least partially overlaps FoV 1404 of infrared imaging module 100. In one example, infrared imaging module 100 and visible light camera 1406 may be implemented as a dual sensor module sharing a common substrate according to various techniques described in U.S. Provisional Patent Application No. 61/748,018 previously referenced herein. Such a dual sensor module implementation may include common circuitry and/or common restraint devices for infrared imaging and visible light imaging, thereby potentially reducing an overall size of system 102 as compared to embodiments where infrared imaging module 100 and visible light camera 1406 are implemented as individual modules. Additionally, the dual sensor module implementation may be adapted to reduce a parallax error between images captured by infrared imaging module 100 and visible light camera 1406 by reducing the distance between them.

Infrared images captured, processed, and/or otherwise managed by infrared imaging module 100 may be radiometrically normalized infrared images (e.g., thermal images). That is, pixels that make up the captured image may contain calibrated thermal data (e.g., temperature data). As discussed above in connection with FIG. 1, infrared imaging module 100 and/or associated components may be calibrated using appropriate techniques so that images captured by infrared imaging module 100 are properly calibrated thermal images. In some embodiments, appropriate calibration processes may be performed periodically by infrared imaging module 100 and/or processor 195 so that infrared imaging module 100, and hence the thermal images captured by it, may maintain proper calibration.

Radiometric normalization permits infrared imaging module 100 and/or processor 195 to efficiently detect, from thermal images, objects having a specific range of temperature. Infrared imaging module 100 and/or processor 195 may detect such objects efficiently and effectively, because thermal images of objects having a specific temperature may be easily discernible from a background and other objects, and yet less susceptible to lighting conditions or obscuring (e.g., obscured by clothing).

Figure 13:
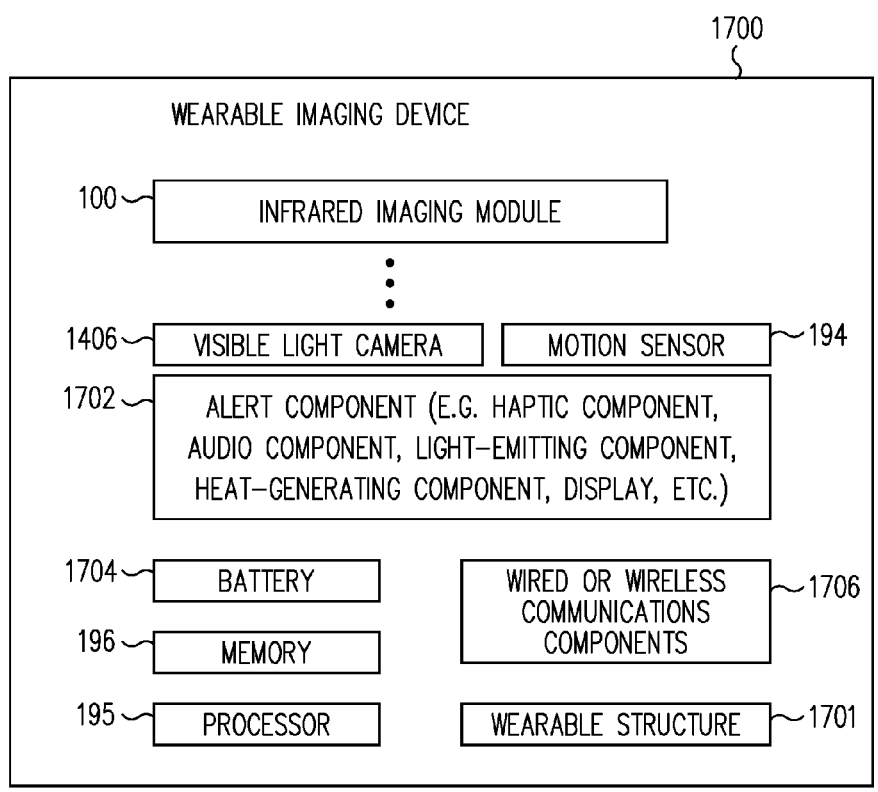
FIG. 13 illustrates a block diagram of a host system that is implemented as a wearable imaging device with infrared imaging modules and alert components in accordance with an embodiment of the disclosure.

System 102 may be implemented as a fixed installation including various thermal and/or non-thermal imagers and a display that displays panoramic images based on the captured images or may be implemented as a portable or wearable device. In one suitable configuration that is sometimes discussed herein as an example, system 102 may be implemented as a wearable device, such as wearable imaging device 1700 of FIG. 13. As shown in FIG. 13, wearable imaging device 1700 may include one or more wearable structures, such as wearable structure 1701 and one or more infrared imaging modules 100. Wearable imaging device 1700 may, for example, be a wearable multisensor array that includes several infrared imaging modules 100 that each have a field of view (FoV) that covers a portion of a scene, such as scene 1430.

In one embodiment, wearable structure 1701 may be a head piece, such as a protective helmet, that protects a wearer's head from injury due to a fall, a falling object or a projectile such as a bullet. However, this is merely illustrative. If desired, wearable structure 1701 may be another wearable structure such as a hat, a self-contained breathing apparatus (SCBA), a backpack, an arm band, a leg strap, goggles, glasses, or other suitable clothing piece on which infrared imaging devices can be mounted or integrated.

As shown in FIG. 13, wearable imaging device 1700 may include one or more visible light cameras 1406, one or more motion sensors 194, one or more batteries such as battery 1704, memory such as memory 196, one or more processors such as processor 195, communications components such as wired or wireless communications components 1706, and one or more wearer alert modules such as alert component 1702.

Alert component 1702 may include one or more haptic components, audio components, light-emitting components, heat-generating components, displays such as display 197 or other suitable components for providing an alert to a wearer of wearable imaging device 1700 in response to the detection of an object in image data from infrared imaging module(s) 100 and/or visible light camera(s) 1406.

Haptic components may include mechanical vibrators, piezoelectric components, or other movable components for generating motion in device 1700 to alert the wearer of device 1700. Audio components may include one or more speakers. Light-emitting components may include one or more light-emitting diodes, light bulbs, portions of a display, other light-generating components. Heat-generating components may include resistive heating elements such as ceramic heating elements or other suitable components for generating heat to alert the wearer of device 1700 of a detected object in a thermal and/or visible light image. A display may include a monochrome or color display that uses any suitable display technology (e.g., liquid-crystal, light-emitting-diode, or other display technology).

Battery 1704 may be a lithium ion battery, a lithium polymer battery, a nickel cadmium battery, a nickel metal hydride battery, or other suitable type of battery technology for a portable wearable imaging device. System 1700 may include one, two, three, or more than three batteries or, if desired, system 1700 may be powered by an external battery or battery pack (e.g., through a wired connection to a battery in a backpack or other portable vessel).

Memory 196 may include one or more memory devices to store data and information, including thermal images and monitoring information. The one or more memory devices may include various types of memory for thermal image and other information storage including volatile and non-volatile memory devices, such as RAM (Random Access Memory), ROM (Read-Only Memory), EEPROM (Electrically-Erasable Read-Only Memory), flash memory, and/or a disk drive. In one embodiment, thermal images and monitoring information stored in the one or more memory devices may be retrieved later for purposes of reviewing and/or further diagnosing the conditions of the environment monitored by device 1700. In various embodiments, processor 195 may be configured to execute software instructions stored on memory 196 to perform various methods, processes, or operations in the manner described herein.

Display 197 may be configured to present, indicate, or otherwise convey images such as thermal images, non-thermal images, panoramic images, and/or other monitoring information generated by processor 195, infrared imaging modules 100, and/or visible light cameras 1406. In various embodiments, display 197 may be implemented with an electronic display screen such as a liquid crystal display (LCD), a cathode ray tube (CRT), light-emitting-diode (LED) or various other types of generally known video displays and monitors or may be implemented as a projection display such as a pico-projector or a retina projector.

Display 197 according to such embodiments may be suitable for presenting user-viewable thermal images converted by processor 195 from thermal images captured by infrared imaging modules 100. Display 197 according to such embodiments may be suitable for presenting user-viewable panoramic images (e.g., panoramic thermal and/or non-thermal images) generated by processor 195 from thermal and/or non-thermal images captured by infrared imaging modules 100 and/or non-thermal imaging modules. User-viewable panoramic images may be panoramic images such as 360 degree field of view panoramic images that include a high resolution central portion and surrounding, gradient compressed peripheral portions. Other images such as non-panoramic images (e.g., zoomed-in views of portions of a panoramic or non-panoramic image) may also be provided with a high resolution central portion and surrounding, gradient compressed peripheral portions.

In some embodiments, existing display screens on external devices, such as mobile phones, tablet devices, laptop computers, desktop computers, automobile information display systems, or any other devices that may receive the thermal images, non-thermal images, and/or the monitoring information from a device or installation such as wearable imaging device 1700, may be used to present the images, panoramic images, and/or monitoring information to a user.

In this regard, communications components 1706 may be configured to handle, manage, or otherwise facilitate wired and/or wireless communication between various components of wearable imaging device 1700 and between wearable imaging device 1700 and an external device. For example, wearable imaging device 1700 may transmit and receive data to and from other wearable imaging devices 1700 or to and from other equipment, such as a base station, through communications components 1706. In another example, wearable imaging device 1700 may transmit and receive data to and from an external device, which may receive and further process raw/processed thermal and/or non-thermal images, panoramic images, and/or monitoring information for presentation to a user, through communications components 1706 configured to manage wired and/or wireless connections.

In various embodiments, communications components 1706 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), mobile cellular component, a wireless satellite component, or other appropriate wireless communication components. Communication module 1706 may also be configured for a proprietary wireless communication protocol and interface based on radio frequency (RF), microwave frequency (MWF), infrared frequency (IRF), and/or other appropriate wireless transmission technologies. Communications components 1706 may include an antenna coupled thereto for wireless communication purposes. Thus, in one example, communications components 1706 may handle, manage, or otherwise facilitate wireless communication by establishing wireless link to other wearable imaging device 1700, to a base station, to a wireless router, hub, or other appropriate wireless networking devices.

In various embodiments, communications components 1706 may be configured to interface with a wired network via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communication module 1706. Communications components 1706 may be configured to communicate over a wired link (e.g., through a network router, switch, hub, or other network devices) for wired communication purposes. For example, a wired link may be implemented with a power-line cable, a coaxial cable, a fiber optics cable, or other appropriate cables or wires that support corresponding wired network technologies.

In some embodiments, wearable imaging device 1700 may comprise as many such communication components 1706 as desired for various applications of wearable imaging device 1700 to suit various types of monitoring environments. In other embodiments, communication components 1706 may be integrated into or implemented as part of various other components of wearable imaging device 1700. For example, infrared imaging module 100, processor 195, and display 197 may each comprise a subcomponent that may be configured to perform the operations of communications components 1706, and may communicate via wired and/or wireless connection without separate components 1706.

Motion sensors 194 may be monitored by and provide information to infrared imaging modules 100 and/or processor 195 for performing various NUC techniques described herein.

In various embodiments, one or more components of wearable imaging device 1700 may be combined and/or implemented or not, as desired or depending on application requirements. For example, processor 195 may be combined with infrared imaging modules 100, memory 196, and/or communications components 1706. In another example, processor 195 may be combined with infrared imaging modules 100 with only certain operations of processor 195 performed by circuitry (e.g., processor, logic device, microprocessor, microcontroller, etc.) within infrared imaging modules 100.

If desired, wearable imaging device 1700 may include one or more alert components associated with each infrared imaging module 100. In this way, when an object such as a person is detected in images from one of infrared imaging modules 100, alert components associated with that infrared imaging device (e.g., one or more alert components 1702 that are co-located with that infrared imaging device) can be activated to alert the wearer to both the presence and the location of the detected person.

Infrared imaging modules 100 of wearable imaging device 1700 may be configured to capture, process, and/or otherwise manage infrared images (e.g., including thermal images) of a scene such as scene 1430 (see FIG. 12). In this regard, infrared imaging modules 100 may be attached, mounted, installed, or otherwise disposed at any suitable location on or within device 1700 that allows at least a portion of the scene to be placed within field of view (FoV) 1404 of each infrared imaging module 100.

Figure 14:
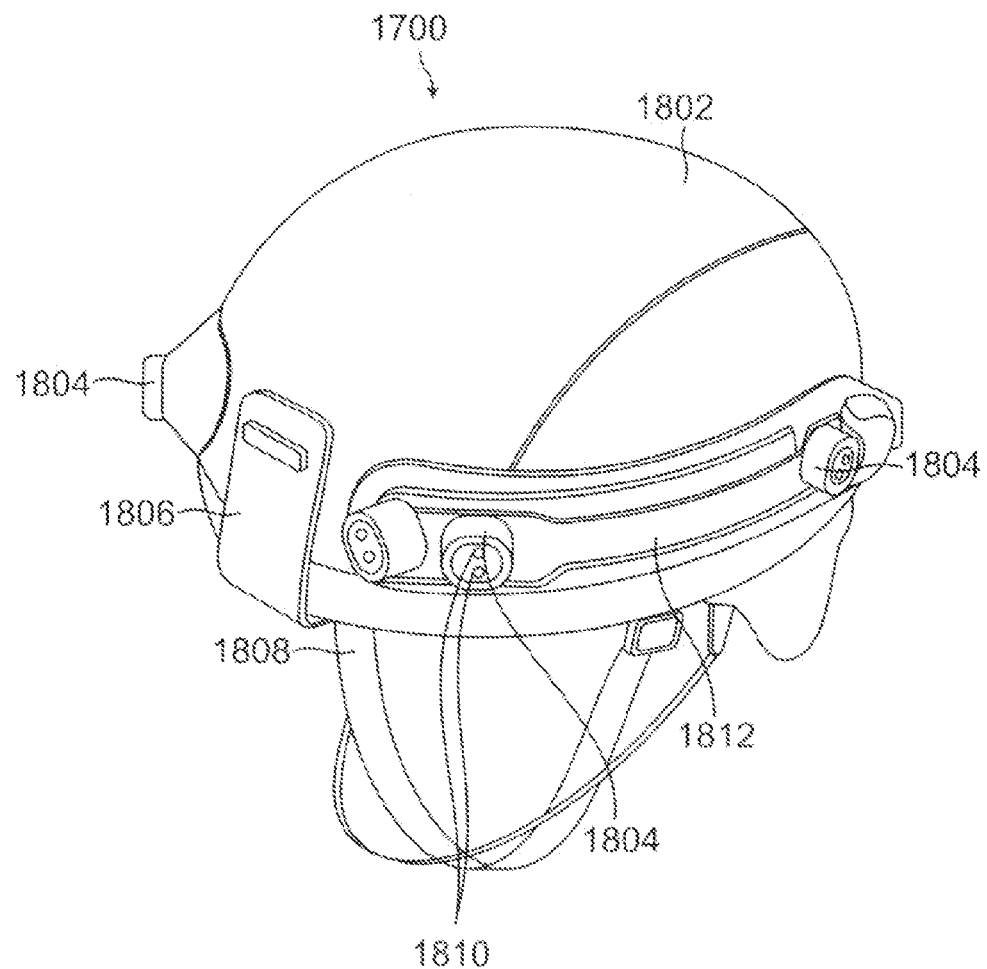
FIG. 14 illustrates a wearable imaging device that is implemented as a multidirectional threat monitoring helmet in accordance with an embodiment of the disclosure.

In one embodiment, several infrared imaging modules may be disposed around some or all of a wearable structure, such as a helmet, as shown in FIG. 14. In the example of FIG. 14, wearable structure 1701 of FIG. 13 is implemented as a protective head covering structure, such as protective helmet 1802. A wearable imaging device that has been implemented as multidirectional threat monitoring helmet of the type shown in FIG. 14 may be provided with imaging modules 1804 at various locations on helmet 1802. For example, imaging modules 1804 may be disposed at various locations around a circumference of a wearable structure such as helmet 1802. Each imaging module 1804 may include an infrared imaging module 100 and a visible light camera 1406, more than one infrared imaging module 100, more than one visible light camera 1406 or any other suitable combination of individual imaging components 1810. As discussed in more detail below, imaging modules 1804 may include infrared imaging modules 100 having a common resolution, or some imaging modules 1804 may include infrared imaging modules 100 having a higher resolution than the infrared imaging modules of other imaging modules 1804. For example, in some embodiments, imaging modules 1804 with fields of view that include a forward looking portion of a scene may be relatively high resolution imaging modules, and imaging modules 1804 that view other portions of a scene (e.g., portions above or behind the wearer or in other peripheral portions of the scene) may be relatively lower resolution imaging modules.

Wearable imaging device 1700 may include imaging components 1810 disposed in a housing, such as housing 1812. In some embodiments, housing 1812 may include clamps, clips, suction cups, or other suitable attachment mechanisms to releasably attach housing 1812, and hence, imaging components (e.g., infrared imaging modules 100), to a suitable wearable mounting structure such as helmet 1802. In some embodiments, housing 1812 may be fixedly attached to a mounting structure with an appropriate fastener.

Additional components, such as processor 195, communications components 1706, and memory 196, may be located within housing 1812 or within other portions of helmet 1802. Wearable imaging device 1700 may include additional structures, such as chin strap 1808, for holding helmet 1802 in place on a wearer's head, and flap structure 1806. Flap structure 1806 may be a structural component and/or a functional component of device 1700. For example, flap structure 1806 may include a display such as a flip-down display that the wearer of device 1700 can move into and out of view for viewing images based on image data captured using imaging components 1810.

As discussed below, infrared imaging modules 100 and/or non-thermal imaging modules may be attached to a wearable structure, such as a helmet, as needed in order to place up to 360 degrees (i.e., panoramic or even hemispheric) of a real-world scene within the FoV of the infrared imaging modules and/or non-thermal imaging modules. Such imaging modules can have partially overlapping, completely overlapping, or non-overlapping fields of view. Images captured by the infrared imaging modules can be stitched, compressed, stretched, or otherwise processed so that a wearer of a wearable imaging device or apparatus can view panoramic images of up to 360 degrees of the real-world scene.

Figure 15:
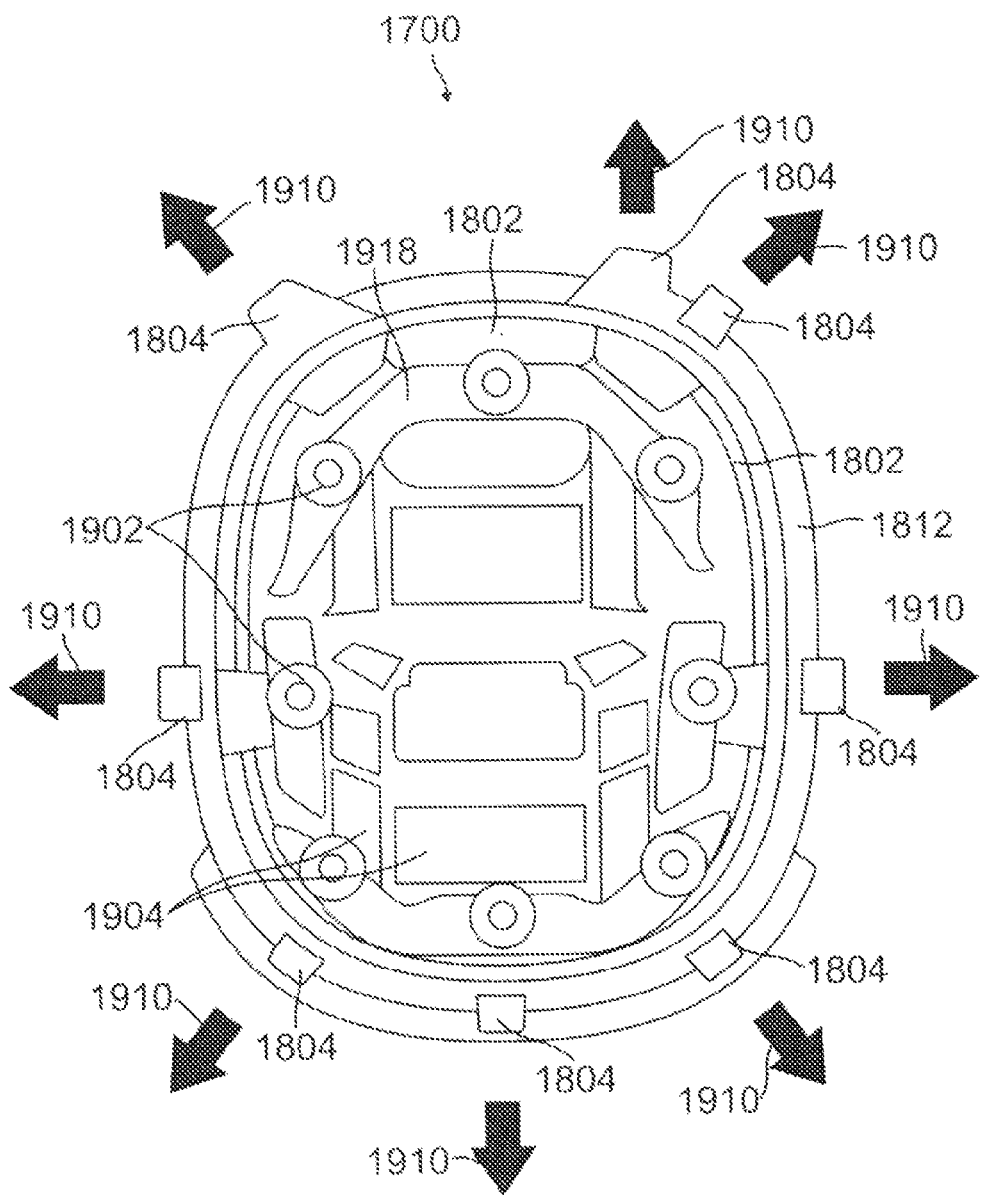
FIG. 15 illustrates a top view of the multidirectional threat monitoring helmet of FIG. 18 showing how multiple imaging modules may be used to monitor portions of the surrounding environment in multiple directions in accordance with an embodiment of the disclosure.

FIG. 15 is a top plan view of wearable imaging device 1700 showing how multiple imaging modules 1804 (each containing one or more imaging components, such as infrared imaging modules 100 and/or visible light cameras 1406) may be disposed around helmet 1802 and pointed in a particular direction 1910. A wearable imaging device configured in this way may enable each imaging module 1804 to view a portion of a complete 360 degree scene around the wearer of device 1700. In this way, device 1700 may be used to monitor potential threats to the wearer of device 1700 in a multidirectional manner.

Wearable imaging device 1700 may include a forward facing imaging module 1502 that faces in a direction 1504 in front of the wearer of device 1700. Imaging module 1502 may include an infrared imaging module 100, a visible light camera 1406, an infrared imaging module 100 and a visible light camera 1406, more than one infrared imaging module 100, more than one visible light camera 1406 or any other suitable combination of individual imaging components. Imaging module 1502 may, for example, include an include infrared imaging module and/or a visible light camera, either or both of which can have pan/tilt capabilities, having resolutions that are higher than those of the corresponding imaging components of imaging modules 1804.

As shown in FIG. 15, a wearable imaging device 1700 that is implemented as a multidirectional threat monitoring helmet may include additional structures and components such as components 1902, 1904, and 1918. In various embodiments, components 1902, 1904, and 1918 may each be functional components (e.g., additional infrared or visible light imaging devices, processors, memory, batteries, communications components, motion sensors, alert components, or other functional components) or structural components such as strength reinforcing structures (e.g., woven bulletproof structures, metal or polymer strengthening components, and the like). In one suitable example, components 1902 may be alert components, such as alert components 1702 of FIG. 13, that are associated with each imaging module 1804. Alert components may be positioned at various locations around a circumference of helmet 1802 (e.g., at locations corresponding to the positions of infrared imaging modules disposed around the circumference of helmet 1802).

Figure 16:
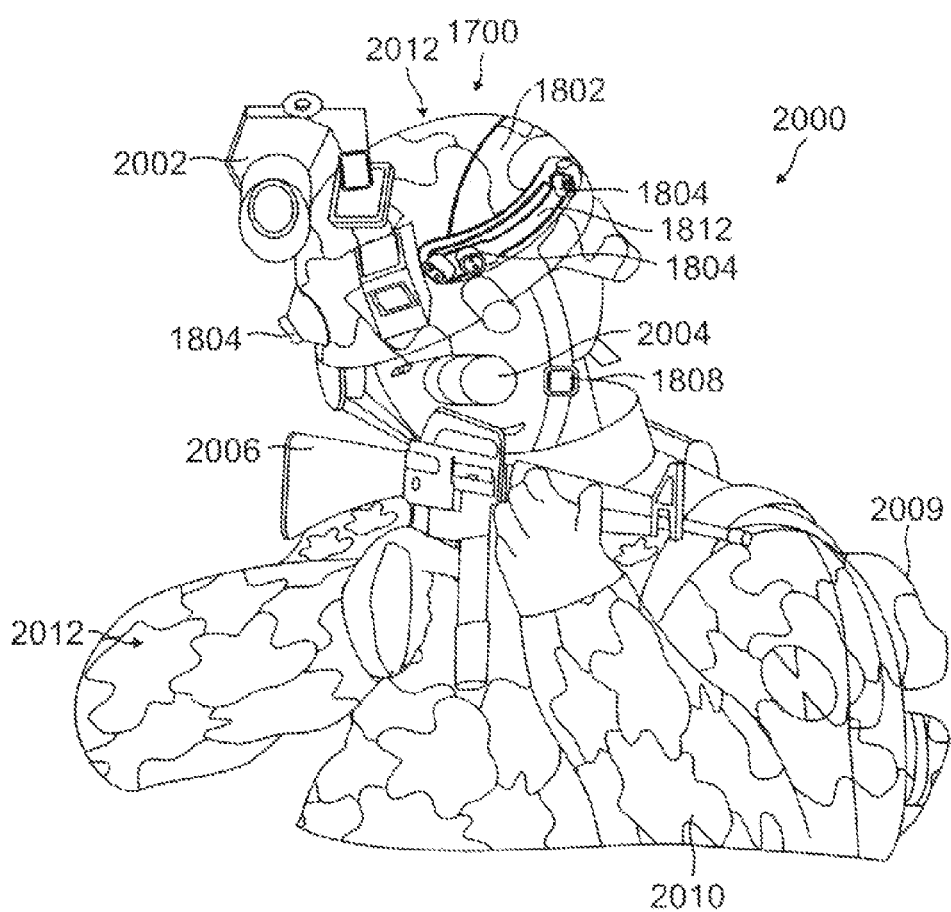
FIG. 16 illustrates a wearer of a multidirectional threat monitoring helmet wearing the multidirectional threat monitoring helmet along with other systems in accordance with an embodiment of the disclosure.

As shown in FIG. 16, in some embodiments, wearable imaging device 1700 may be integrated into a larger wearable system, such as system 2000. System 2000 may be an individual tactical defense system for a person, such as soldier 2010, that includes wearable imaging device 1700, additional cameras such as camera 2002, weapons, such as rifle 2006, display devices, such as display 2004, and backpack 2009. Backpack 2009 may be used to carry a power supply, additional memory, or other components or devices for operating device 1700 and/or other components of system 2000.

Display 2004 may be a portion of wearable imaging device 1700 (e.g., a flip-down, or drop-down display that displays images captured using infrared imaging modules 100 and/or visible light cameras 1406 mounted in housing 1812 on helmet 1802, or a projector display) or may be a separate display component. Display 2004 may be used to display images from other portions of system 2000 (e.g., additional camera 2002 or weapon 2006).

As shown in FIG. 16, helmet 1802 may include a patterned cover material, such as patterned material 2012, that matches patterned material 2012 on other portions of a wearer's clothing to reduce the visibility of wearer 2010 to others. Patterned material 2012 may be a patterned fabric, a patterned coat of paint, or other patterned material. Patterned material 2012 may have a camouflage pattern suitable for an environment in which wearer 2010 is located.

In one embodiment, a component of wearable imaging device 1700 (e.g., processor 195) may be configured to generate image data, such as thermal images from imaging module 1502 and one or more imaging modules 1804 for display of the images to the wearer. Device 1700 may also detect from the thermal images a contiguous region of pixels (also referred to as a "blob" or "warm blob") having a temperature approximately in the range of a person, for example, between approximately 75° F. (e.g., clothed part of a body) and approximately 110° F. (e.g., exposed part of a body, such as a face and hands). Such a "warm blob" may indicate a presence of a person in the vicinity of device 1700, and may be analyzed further as described herein to ascertain the presence of the person, track the motion of the person, determine the location of the person, and/or determine various other attributes associated with the detected person.

Processor 195 may be configured to receive thermal image data captured by infrared imaging modules 100. Processor 195 may be configured to perform, on the received thermal images of a scene, various thermal image processing and analysis operations as further described herein, for example, to process and arrange thermal images from multiple imaging modules for display, detect and track a person or an animal, and/or determine various attributes associated with the person or animal. Processor 195 may be configured to collect, compile, analyze, or otherwise process the outcome of the thermal image processing and analysis operations to generate monitoring information such as threat detection information. As discussed below, processor 195 may also be configured to "stitch" images together to form panoramic images and to compress portions of those images so as to provide a view that is relatively easy to fit on an average or small display, yet provides high resolution in areas of interest and enable a full 360 degree situational awareness in a way that the human brain is used to interpreting.

In one example, wearable imaging device 1700 may be configured to determine the presence and location of a human (or an animal), and generate an alert upon detection of the human (or animal). In this regard, wearable imaging device 1700 may be configured to detect and track the location of the person or animal and, if desired, detect and track a face and facial features or other features of a person in the thermal images according to one or more embodiments of the disclosure. Wearable imaging device 1700 may be configured to alert the wearer of device 1700 to the location of the detected person (or animal) by activating an alert component located near the imaging module that generated the images in which the person was detected. For example, if a person is located behind the wearer, a vibration, a sound, and/or heat (as examples) at the rear of the helmet may be generated to form a location-specific alert for the wearer of the detected person behind them.

In other embodiments, if visible light images captured by visible light cameras 1406 in imaging modules 1804 are available, wearable imaging device 1700 may be configured to track features of a scene, such as multiple individual people or even the face and facial features of an individual person, based additionally or alternatively on the visible light images. For example, the visible light images may provide more detail and contrast than the thermal images in certain ambient light conditions, and thus, may be analyzed using suitable face tracking algorithms in such favorable light conditions. In another example, both the visible light images and the thermal images may be analyzed to complementarily increase detection and tracking accuracy. In another example, the thermal images and the visible light images may be combined or fused as further described herein, and the combined or fused images may be displayed to the wearer and/or analyzed to track the features of the scene. If wearable imaging device 1700 is configured to detect and track the features of a scene using the visible light images, processor 195 may be further configured to convert pixel coordinates of the tracked features in the visible light images to corresponding pixel coordinates in the thermal images, and vice-versa.

In one embodiment, wearable imaging device 1700 may be configured to detect a presence of exhaled breaths of a person or animal. Exhaled breaths may appear in the thermal images for a short period after each exhalation, and may be detectable as a distinct plume of gas rich in $CO_2$ and having a temperature slightly lower than the body temperature. Thus, by analyzing images to detect a group of pixels having radiometric properties characteristic of such gases, exhaled breaths may be detected. Moreover, as discussed above in connection with optical elements 1403 of infrared imaging module 100, narrow-band filters may be utilized in some embodiments of modules 100 in wearable imaging device 1700, so that infrared radiation absorbed and emitted by $CO_2$ may be shown more clearly and in higher contrast to infrared radiation from other substances for an improved detection of exhaled breaths. Wearable imaging device 1700 may be configured to generate an alert, such as a location-specific alert, when, for example, an exhaled breath is detected.

In another embodiment, wearable imaging device 1700 may be configured to detect breathing by analyzing infrared images captured using one or more infrared imaging modules 100 to detect periodic variations in the temperature and/or shape of a detected oronasal region of a detected person or animal. For example, wearable imaging device 1700 may be configured to detect periodic alteration of slightly higher and lower temperatures in the nostrils and/or periodic movement of the oronasal region, which may be indicative of periodic inhalation and exhalation cycles. It is also contemplated that wearable imaging device 1700 may be configured to detect breathing by performing other suitable analysis and/or processing operations, for example, for detecting various periodic variations indicative of breathing. In various embodiments, processor 195 may be configured to detect breathing by performing any combination of breathing detection operations described herein.

Figure 17:
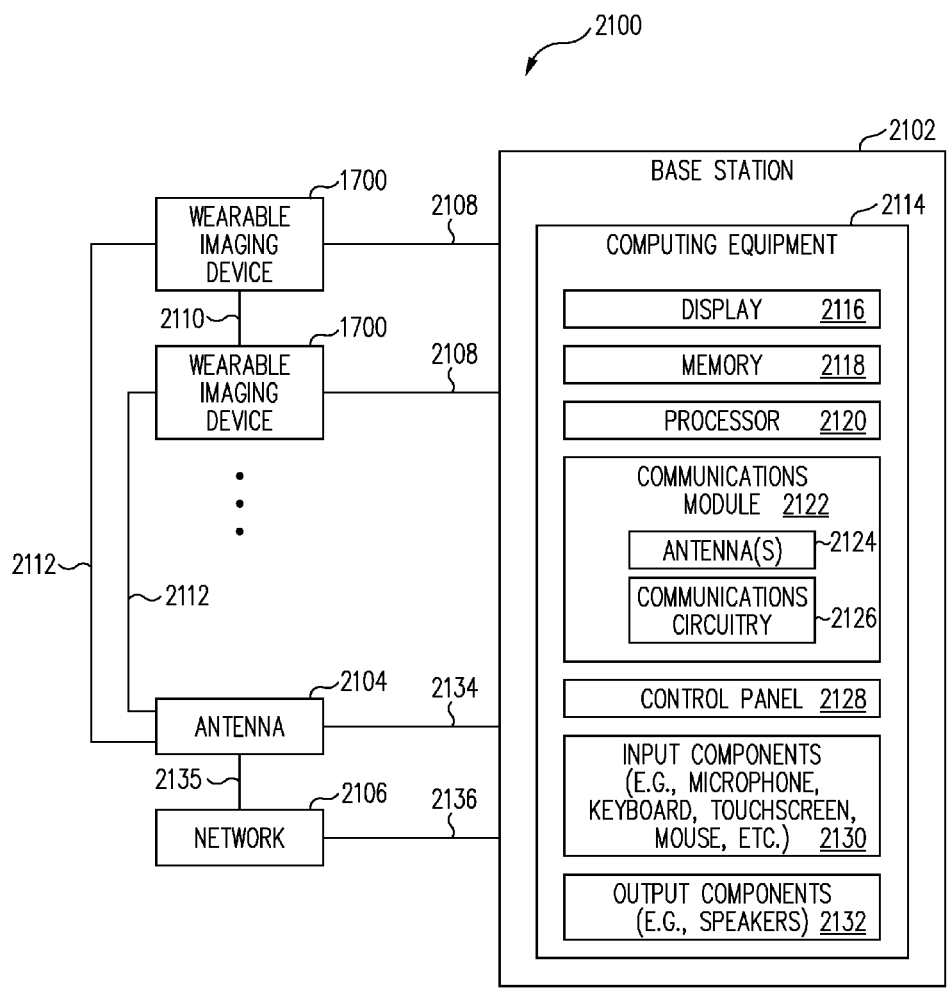
FIG. 17 illustrates a block diagram of a threat monitoring system that includes wearable imaging devices in accordance with an embodiment of the disclosure.

FIG. 17 is a block diagram showing how multiple wearable imaging devices may be communicatively coupled to each other and to other components of a larger system. As shown in FIG. 17, system 2100 may include one or more wearable imaging devices 1700 and a base station 2102. Each wearable imaging device 1700 may be communicatively coupled to each other wearable imaging device over a communications path 2110 (e.g., a wireless radio-frequency communications path). Each wearable imaging device 1700 may be communicatively coupled to base station 2102 over communications paths 2108 (e.g., a wireless radio-frequency communications path). In some embodiments, one of wearable imaging devices 1700 may serve as a base station (e.g., a wearable imaging device worn by a commander of a unit of soldiers wearing devices 1700). However, this is merely illustrative. In some embodiments, wearable imaging devices 1700 may communicate with base station 2102 through an antenna, such as antenna 2104, and/or through a network, such as network 2106 (e.g., a closed proprietary network or a global network, such as the Internet).

For example, wearable imaging devices 1700 may transmit signals to antenna 2104 over paths 2112 (e.g., wired or wireless communications paths) and antenna 2104 may transmit some or all of the received signals to base station 2102 over path 2134 (e.g., a wired or wireless communications path). As another example, wearable imaging devices 1700 may transmit signals to antenna 2104 over paths 2112, antenna 2104 may transmit some or all of the received signals network 2106 over path 2135 (e.g., a wired or wireless communications path), and base station 2102 may receive information associated with the signals over path 2136 (e.g., a wired or wireless communications path).

As shown in FIG. 17, base station 2102 may include computing equipment 2114. Computing equipment 2114 may be located in a common geographical location with wearable imaging devices 1700 or may be located remotely from wearable imaging devices 1700. For example, base station 2102 may be a remote command center that communicates with soldiers in various geographical locations, or base station 2102 may be a field command center from which the soldiers are locally deployed.

Computing equipment 2114 may include various computing modules suitable for communicating with devices 1700 and for processing and storing images and/or other monitoring information received from devices 1700. Computing equipment 2114 may include one or more displays 2116, storage, such as memory 2118, processing equipment, such as processor 2120, communications components, such as communications module 2122, control components, such as control panel 2128, input components, such as input components 2130, and/or output components, such as output components 2132. Communications module 2122 may include one or more antennas 2124 and additional communications circuitry 2126 (e.g., radio-frequency front end circuitry, signal generation circuitry, modulation circuitry, etc.). Input components 2130 may include a microphone, a keyboard, a touchscreen, a mouse, and/or other components suitable for receiving user input. Output components may include one or more speakers, headphones, or other output components.

Figure 18:
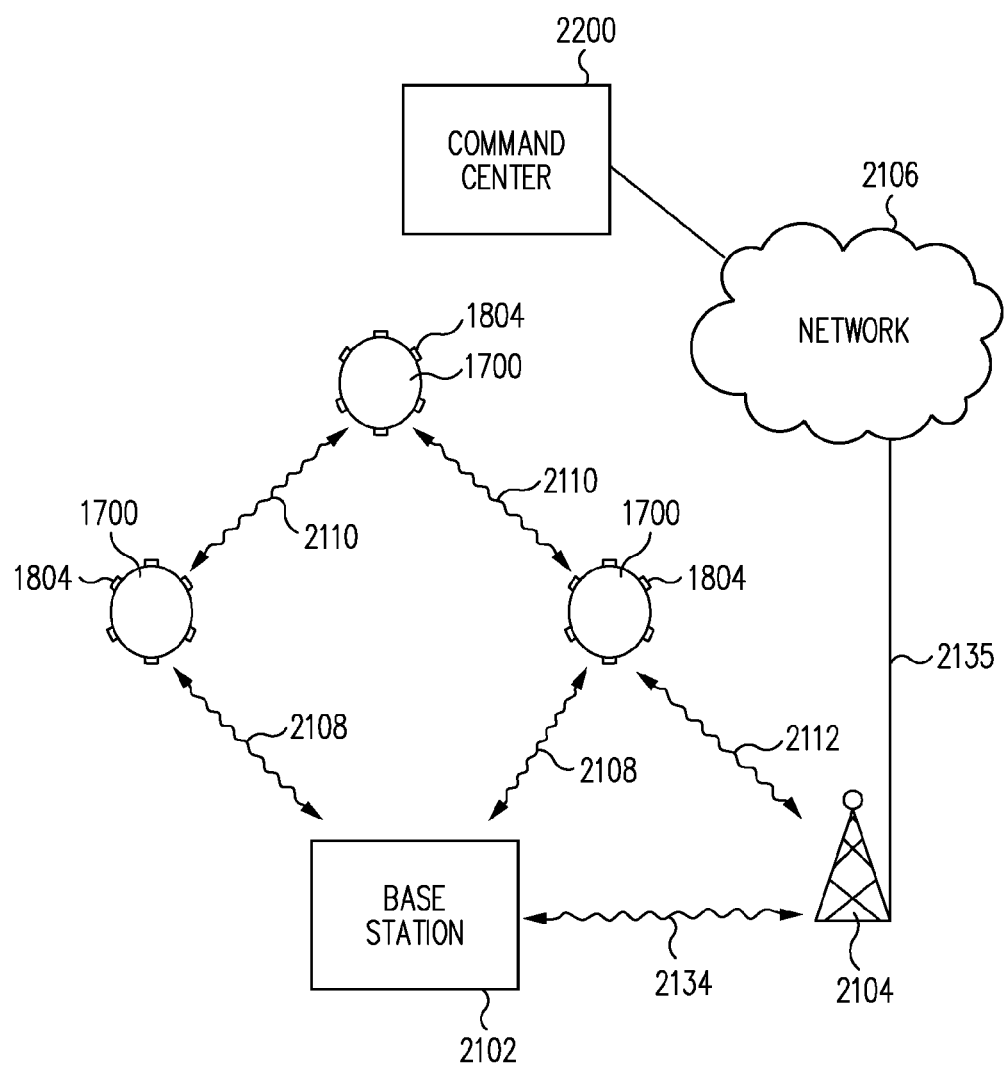
FIG. 18 illustrates a threat monitoring system and shows how one or more multidirectional threat monitoring helmets may communicate with each other and with a base station in accordance with an embodiment of the disclosure.

As shown in FIG. 18, multiple wearable imaging devices 1700 may be used to communicate with each other, with base station 2102 and, if desired, an additional remote command center, such as command center 2200. Command center 2200 may communicate with base station 2102 and/or devices 1700 through antenna 2104 and network 2106. For example, command center 2200 may be located on a ship, underground, in a different country, on a different continent, or may be otherwise remotely located from wearable imaging devices 1700. In some embodiments, when one of devices 1700 detects an object, such as a potential human threat, that device may alert the wearer of the device 1700 and may also transmit detection and location information associated with the detected object to other devices 1700, which may, in turn, alert the wearers of those devices to the detection and location of the object.

Figure 19:
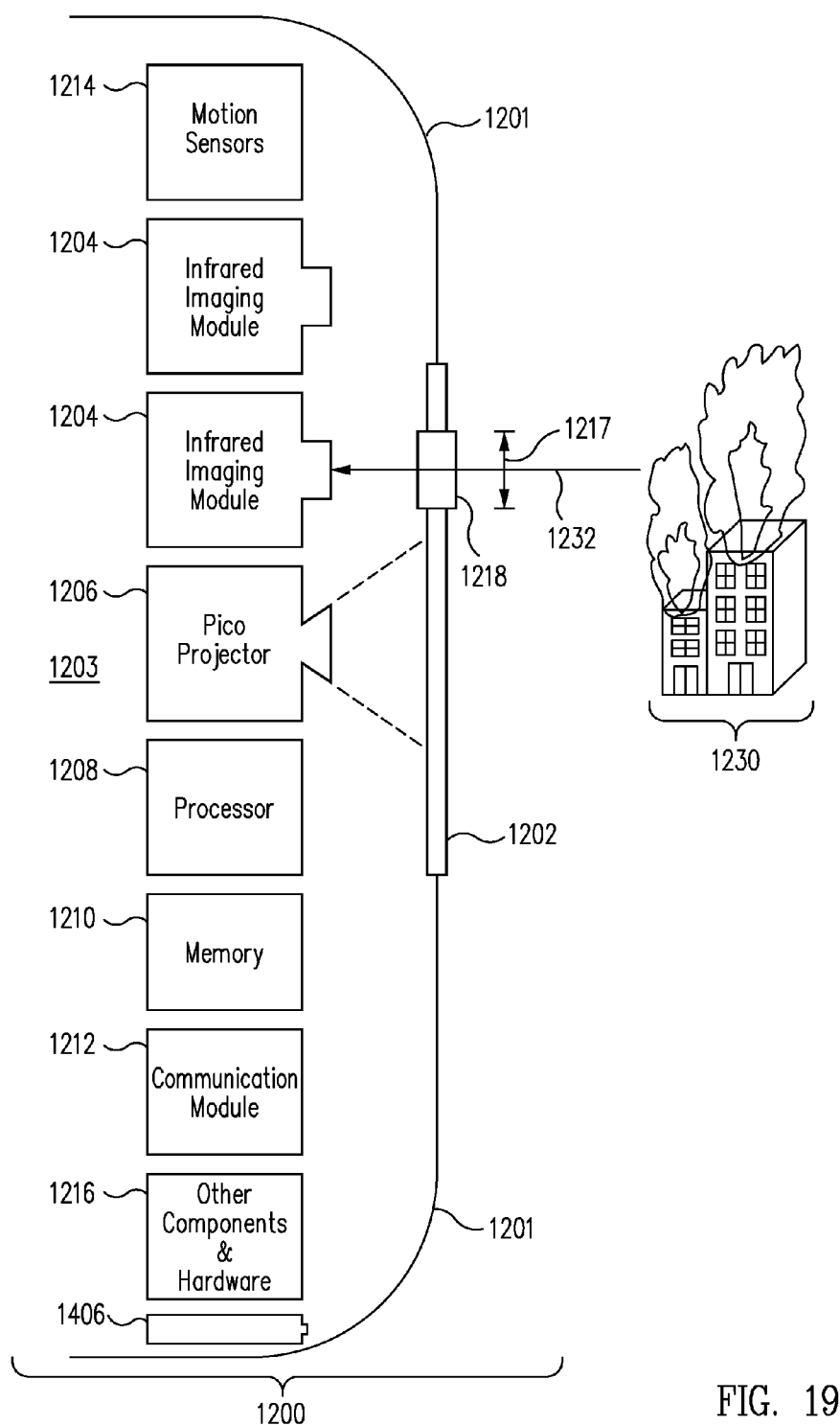
FIG. 19 illustrates a block diagram of a wearable apparatus in accordance with an embodiment of the disclosure.

Referring now to FIG. 19, a block diagram is shown of a wearable apparatus 1200 in accordance with an embodiment of the disclosure. Wearable apparatus 1200 may include a shield 1202, one or more infrared imaging modules 1204 (e.g., infrared imaging modules 100), a projector 1206, a processor 1208, a memory 1210, a communication module 1212, motion sensors 1214, and other components and hardware 1216. In various embodiments, infrared imaging modules 1204, processor 1208, memory 1210, and motion sensors 1214 may be implemented in the same of similar manner as corresponding components of host device 102 of FIG. 1. Moreover, the various components of wearable apparatus 1200 may be configured to perform various NUC processes and other processes described herein.

Shield 1202 protects at least a portion of a user's face from an external environment 1230 when wearable apparatus 1200 is worn by a user (e.g., generally identified by reference number 1203 in FIG. 19). Shield 1202 may be made of polymers (e.g., polycarbonate), metal, or any other appropriate materials durable enough to provide a protective barrier against heat, intensive light rays, debris, and/or other harmful elements from external environment 1230. Shield 1202 may comprise or may be coated with one or more appropriate protective layers to enhance or provide protection against such harmful elements.

In various embodiments, shield 1202 may provide a protective barrier against external environment 1230 for various components of wearable apparatus 1200 as well. For example, infrared imaging modules 1204, projector 1206, processor 1208, memory 1210, communication module 1212, motion sensors 1214, and/or any appropriate components of wearable apparatus 1200 may be positioned internal to wearable apparatus 1200 (e.g., behind shield 1202 and away from external environment 1230), so that shield 1202 provides protection to these components in addition to protecting at least a portion of a user's face.

Although shield 1202 is illustrated in FIG. 19 as having a limited length, shield 1202 may be implemented with any desired size. Moreover, wearable apparatus 1200 may include one or more structural members 1201 to partially or completely enclose a face, head, or any desired portion of user 1203 (e.g., including the entirety of user 1203 if desired).

In one embodiment, shield 1202 may pass at least some visible light so that user 1203 can view external environment 1230 through shield 1202, while still being protected against harmful radiation (e.g., appropriate types of infrared radiation, ultraviolet radiation, and/or others), debris, and/or other elements. In another embodiment, a portion, a majority, or an entirety of shield 1202 may be opaque or nontransparent (e.g., when shield 1202 is made of metal). In some embodiments, a surface of shield 1202 may comprise a plate onto which images may be projected from projector 1206.

Infrared imaging modules 1204 may be small-form-factor infrared cameras or small-form-factor infrared imaging devices implemented in accordance with various embodiments disclosed herein. Infrared imaging modules 1204 may include an FPA implemented, for example, in accordance with various embodiments disclosed herein or others where appropriate.

Thus, unlike certain CCD-based or CMOS-based imaging sensors which may detect reflected short wave infrared (SWIR) rays (e.g., near-infrared light) from illuminated objects, infrared imaging modules 1204 may be capable of detecting and capturing long wave infrared (LWIR) radiation, mid-wave infrared (MWIR) radiation, and/or other radiation in thermal bands as may be desired. Accordingly, infrared imaging modules 1204 may be configured to capture, process, and/or otherwise manage thermal images (e.g., images including thermal radiation data) of external environment 1230 even in complete darkness, and provide such images and data to processor 1208. For example, thermal images provided by infrared imaging modules 1204 may reveal invisible hazards, such as gas leaks, thermal hot spots, or others. Such thermal images may include an accurate temperature reading of each pixel in the images. In this regard, it will be appreciated that thermal images captured and provided by infrared imaging modules 1204 are significantly more useful than images of amplified visible light and SWIR radiation that may be provided by conventional light intensifiers (e.g., night vision (NV) devices).

In one embodiment, wearable apparatus 1200 may comprise a plurality of infrared imaging modules 1204 and/or non-thermal imaging modules to capture stereoscopic and/or panoramic thermal and/or non-thermal images of external environment 1230. In another embodiment, one or more of a plurality of infrared imaging modules 1204 may provide fault tolerance by serving as backups to each other. In some embodiments, wearable apparatus 1200 may include one or more visible light cameras 1406 as described herein. Thermal images from infrared imaging modules 1204 and/or non-thermal images from visible light camera(s) 1406 may be combined, stitched, stretched, compressed, arranged, corrected or otherwise processed for display to a wearer of apparatus 1200.

In various embodiments, infrared imaging modules 1204 and/or processor 1208 may be configured to provide automatic exposure control (e.g., by controlling signal gain, camera aperture, and/or shutter speed) to adjust to changes in the infrared intensity and temperature level of the external environment.

In various embodiments, one or more infrared imaging modules 1204 and/or one or more visible light camera modules 1406 may be positioned behind shield 1202, so as to be protected from external environment 1230 by shield 1202. In such embodiments, shield 1202 may include an aperture 1217 sealed with a window assembly 1218 capable of passing infrared rays 1232 through to infrared imaging module 1204. Window assembly 1218 may be made of a material (e.g., silicon or other material) having a high transmittance for infrared light, so that infrared light emitted from external environment 1230 reaches infrared imaging module 1204 while shield 1202 blocks infrared light from user 1203 and/or various components of wearable apparatus 1200. In some embodiments, window assembly 1218 may be doped with appropriate material so that only infrared light in a desired wavelength range may pass through. Window assembly 1218 may be implemented in accordance with various types of structures as further described herein with regard to FIG. 20C.

Processor 1208 may be implemented as any appropriate processing device as described with regard to processor 195 in FIG. 1. In some embodiments, at least some part of processor 1208 may be implemented as part of infrared imaging modules 1204 and/or projector 1206.

Processor 1208 may be configured to receive one or more thermal images captured by infrared imaging module 1204 and/or non-thermal images captured by a visible light imaging module, and to process the images to generate user-viewable thermal images (e.g., thermograms), user-viewable non-thermal images, user-viewable combined thermal and non-thermal images, and/or user-viewable panoramic images of a portion of or substantially all of external environment 1230. In one embodiment, processor 1208 may generate and overlay information and/or alarms (e.g., a temperature reading, a gas detection alarm, mask pressure reading and alarm, oxygen tank reading and alarm, and/or others) onto user-viewable images. In some embodiments, processor 1208 may be configured to receive one or more thermal images from two or more infrared imaging modules 1204, and to appropriately combine the thermal images to generate stereoscopic user-viewable images (e.g., three dimensional thermograms) or panoramic user-viewable images of external environment 1230 therefrom.

Projector 1206 may be implemented with any appropriate small form factor projector, including those known as "pico" or "micro" projectors. For example, in one embodiment, projector 1206 may be sized small enough to be embedded inside personal electronic devices such as mobile phones or digital cameras. In various embodiments, projector 1206 may be implemented in accordance with various technologies such as digital light processing (DLP), liquid crystal on silicon (LCoS), laser beam steering (LBS), holographic laser projection (HLP), and/or others as appropriate.

Projector 1206 may be positioned so as to selectively project user-viewable images such as user-viewable thermal images onto an inner surface of shield 1202. For example, projector 1206 can be turned on to project user-viewable thermal images onto a portion of an inner surface of shield 1202 that is comfortably within a line of sight of user 1203 while wearable apparatus 1200 is worn, and can be turned off when user 1203 desires a clear view through shield 1202. Moreover, the direction of a beam from projector 1206 may be adjustable to project user-viewable thermal images onto an area of shield 1202 that is comfortable for viewing by a user, for example, for viewing images projected on shield 1202, and simultaneously viewing external environment 1230 through shield 1202. In some embodiments a fixed-type display such as an LCD screen (e.g., viewed directly, through a scope or an objective lens), may be used to display images to a wearer of apparatus 1200.

In various embodiments, projector 1206 may be configured to perform a distortion correction of user-viewable images projected on a surface of shield 1202, so that the user-viewable images appear flat and geometrically correct even when projected at an oblique angle and/or onto a curved surface of shield 1202. In some embodiments, projector 1206 may optically correct distortion using optical elements, such as lenses, prisms, and mirrors.

In embodiments in which projector 1206 is implemented with HLP technology, distortion may be corrected through appropriate operations performed by projector 1206 and/or processor 1208. In this regard, such HLP technology may implement holographic processes to generate interference or diffraction patterns of an image instead of the image itself, and focused laser beams may be projected through such interference patterns to direct light as desired without relying on optical elements.

In some embodiments, projector 1206 may be configured to project two or more beams of light to present stereoscopic user-viewable images of external environment 1230 as described above. It is also contemplated that projector 1206 may be configured to project three dimensional user-viewable images using HLP technology. It is also contemplated that projector 1206 may be a retina projector that is configured to project an image, such as a thermogram, directly into the eye of the wearer.

Communication module 1212 may be configured to handle internal communication between various components of wearable apparatus 1200. For example, components such as infrared imaging modules 1204, projector 1206, and other sensors may transmit and receive data to and from processor 1208 through communication module 1212, which may manage wired and/or wireless connections (e.g., through proprietary RF links and/or through standard wireless communication protocols such as IEEE 802.11 WiFi standards and Bluetooth™) between the various components.

In some embodiments, communication module 1212 may be further configured to handle communication with devices external to wearable apparatus 1200. For example, communication module 1212 may transmit and receive user-viewable images generated by processor 1208 to and from other wearable apparatuses or a monitoring station so that user-viewable images can be shared with other users. In another example, communication module 1212 may handle a more conventional communication, such as radio communication, between users of wearable apparatus 1200.

Other components and hardware 1216 may be used to implement any features of wearable apparatus 1200 as may be desired for various applications. For example, other components may include various sensors, a microphone and speaker for voice communication, timers, a flashlight, and a visible light camera. Other hardware may include a mask frame, a hood, straps, fasteners, harnesses, connectors, hoses, and other various hardware and protective equipment and clothing as may be desired for certain applications of wearable apparatus 1200.

Thus, it will be appreciated that wearable apparatus 1200 may be implemented as any type of wearable device, equipment, gear, mask, helmet, garment, and/or clothing that includes shield 1202 to protect at least a portion of a user's face from external environment 1230.

Figure 20A:
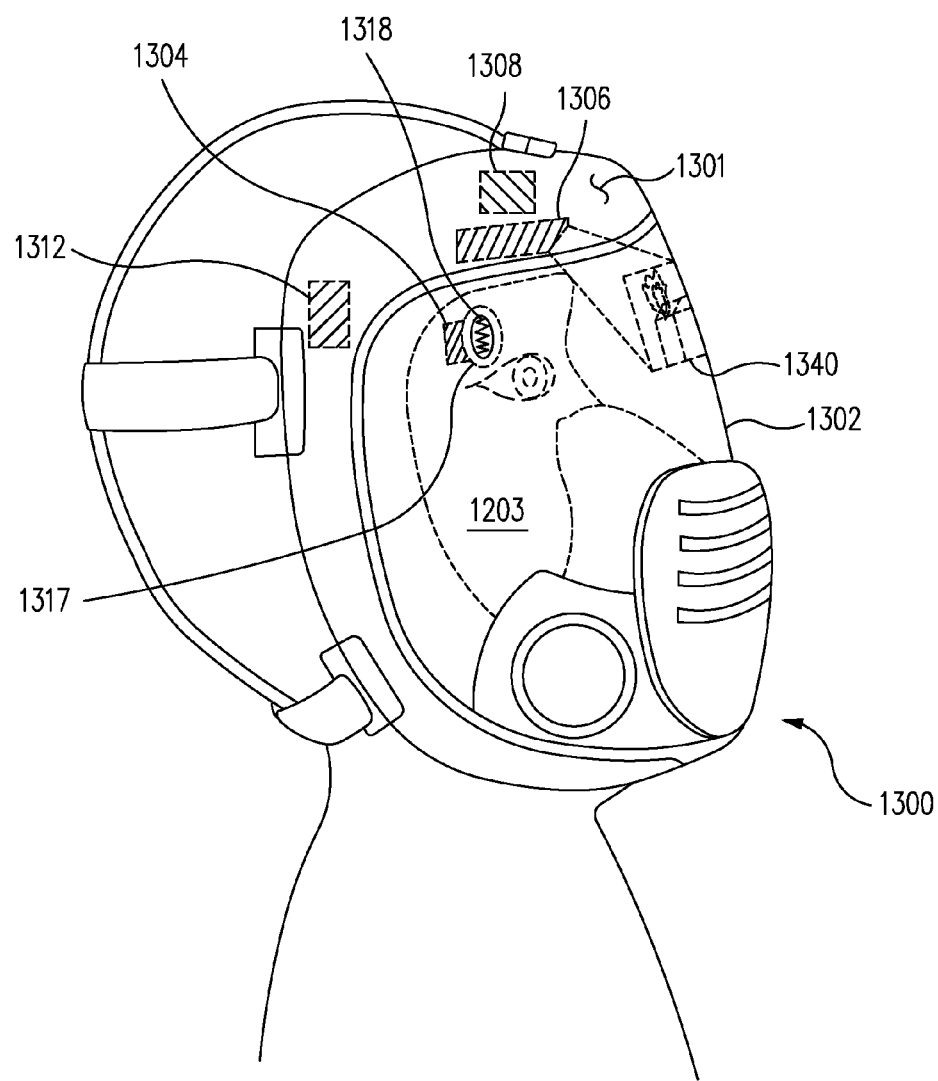
FIGS. 20A-C illustrate various views of a wearable apparatus implemented as a self-contained breathing apparatus (SCBA) in accordance with embodiments of the disclosure.
Figure 20B:
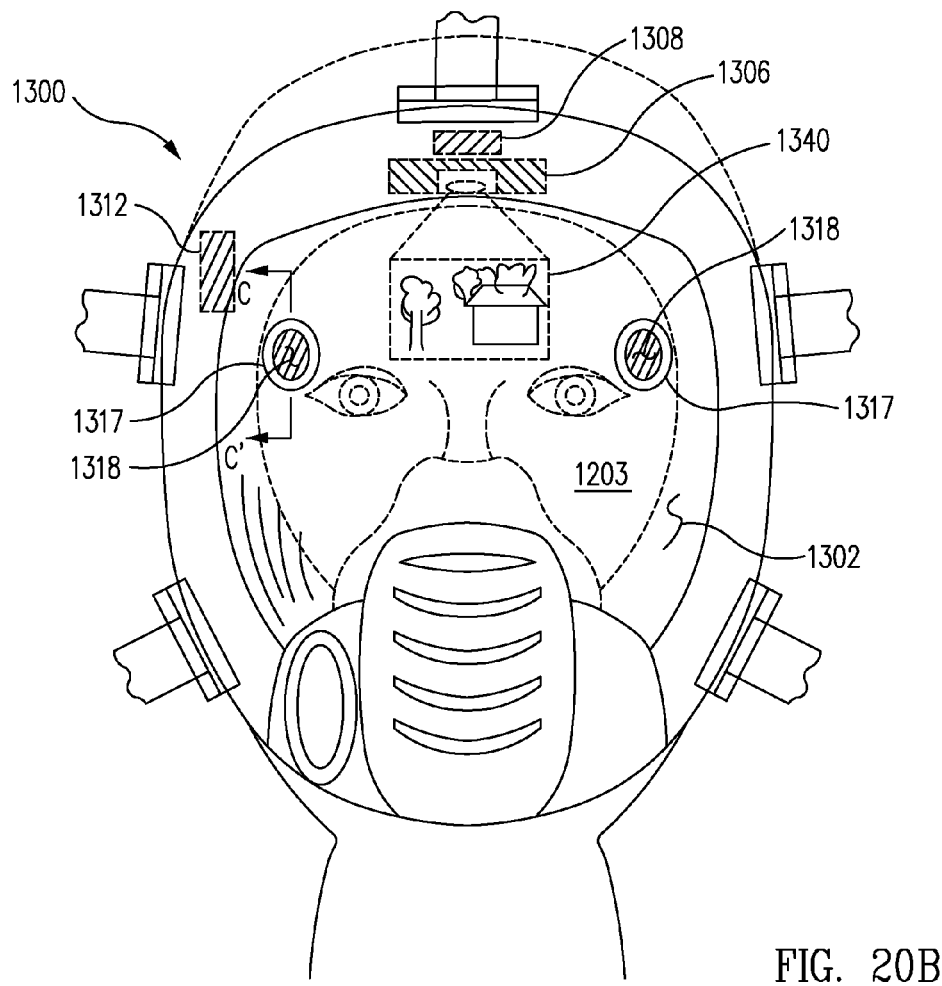
Figure 20C:
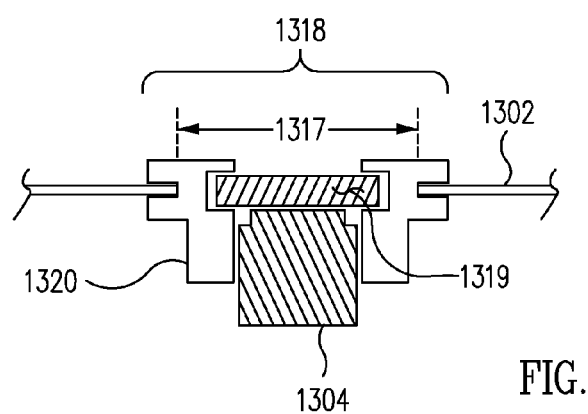

FIGS. 20A-C illustrate various views of wearable apparatus 1200 implemented as a self-contained breathing apparatus (SCBA) 1300, in accordance with embodiments of the disclosure. In particular, FIGS. 20A and 20B illustrate side and front views, respectively, of SCBA 1300 worn by user 1203 and having infrared imaging modules 1304 and a projector 1306 in accordance with embodiments of the disclosure. FIG. 20C illustrates a cross-sectional view of a window assembly 1318 of SCBA 1300, taken along line C-C' of FIG. 20B in accordance with an embodiment of the disclosure.

In one embodiment, SCBA 1300 may be implemented as a face mask for use by firefighters and/or other emergency personnel working in hazardous environments. In this regard, SCBA 1300 may be implemented to attach to a portable air supply (e.g., one or more high-pressure air tanks) and may further include an inhalation connection (e.g., a mouthpiece or oronasal cover and a hose connector) to the air supply while protecting a wearer's face from hazardous environments. In another embodiment, SCBA 1300 may be configured for underwater use as a self-contained underwater breathing apparatus (SCUBA).

SCBA 1300 may include a shield 1302, one or more infrared imaging modules 1304, projector 1306, a processor 1308, and a communication module 1312, all of which may be implemented in the same or similar manner as various corresponding components of wearable apparatus 1200 described above with regard to FIG. 19.

SCBA 1300 may further include a mask frame 1301 (e.g., corresponding to structural members 1201 of FIG. 19) onto which shield 1302 is sealingly fit. Mask frame 1301 may include an edge that compliantly engages the contours of the user's face, so that the user's face and SCBA 1300 form an interior space that is substantially sealed from an external environment. In some embodiments, the interior space of SCBA 1300 may maintain a positive pressure (i.e., higher pressure inside SCBA 1300 than outside) so as to prevent inward leaking.

Shield 1302 may be made of a clear polymer (e.g., polycarbonate) or other similar suitable materials that allow user 1203 to see through it while providing a protective barrier against heat, flames, intense infrared and ultraviolet rays, debris, and/or other harmful elements from an external environment. Shield 1302 may comprise multiple layers of protective shields and/or surface coatings to enhance protection.

One or more infrared imaging modules 1304 may be positioned behind shield 1302 or mask frame 1301, and internal to SCBA 1300. Similarly, projector 1306, processor 1308, communication module 1312, and other components may be placed internal to SCBA 1300 (e.g., behind shield 1302 and behind or within mask frame 1301). It will be appreciated that these various components are thus advantageously protected by shield 1302 and mask frame 1301 of SCBA 1300 itself, without the need for separate protective external housings. It will also be appreciated that the small size and weight of infrared imaging modules 1304 advantageously permit these components to be positioned internal to SCBA 1300. In contrast, conventional infrared cameras are typically too bulky and heavy for such placement and thus must be implemented with separate protective housings that add even further weight and bulk, making them unsuitable for an apparatus worn on the head or face of a user. In another embodiment, one or more infrared imaging modules 1304 may be positioned on or attached to SCBA 1300 externally.

Shield 1302 may include one or more apertures 1317 sealed by corresponding window assemblies 1318 capable of passing infrared radiation through to corresponding infrared imaging modules 1304 situated behind shield 1302, behind mask frame 1301, and/or within mask frame 1301.

In one embodiment, such a window assembly 1318 may include a window 1319 and a frame 1320. Window 1319 may be configured to pass infrared radiation. For example, window 1319 may include silicon and/or other materials where appropriate to pass infrared radiation. Frame 1320 may be configured to hold window 1319 and seal aperture 1317 with window 1319. In another embodiment, window assembly 1318 may be implemented by window 1319 alone without frame 1320. In another embodiment, infrared imaging module 1304 may be configured to seal aperture 1317 to prevent user 1203 from being exposed to the external environment if the seal provided by the window assembly 1318 fails (e.g., to prevent inward leaking of gas, liquid, radiation, and/or other elements into the interior of SCBA 1300).

As discussed above in connection with projector 1206 of FIG. 19, projector 1306 may allow user 1203 to selectively turn on/off and adjust the position of a projected user-viewable thermal image 1340, for example, for simultaneously viewing projected user-viewable thermal image 1340 and an external environment through shield 1302. Distortion correction may be performed by projector 1306 and/or processor 1308 for user-viewable thermal image 1340 to be projected on a curved surface of shield 1302 and/or projected at an oblique angle, as described above. In other embodiments, projector 1306 may project user-viewable thermal image 1340 on an outer surface of shield 1302 and/or a plated portion of a surface of shield 1302.

Thus, it will be appreciated that SCBA 1300 advantageously allows user 1203 (e.g., firefighters, emergency personnel, divers, or anyone wearing SCBA 1300 for protection from an external environment) to comfortably view a user-viewable thermal image 1340 that helps user 1203 to recognize much more about an external environment (e.g., see through smoke, water or in darkness, discern victims or other objects, detect the base of fire, detect the temperature of objects, detect invisible gas leaks, or other phenomena) than what can be seen through the naked eye or through CCD-based or CMOS-based sensors, while also protecting the user's face and various components (e.g., protecting infrared imaging modules 1304, projector 1306, processor 1308 without a need for bulky and heavy external protective housings).

Figure 21:
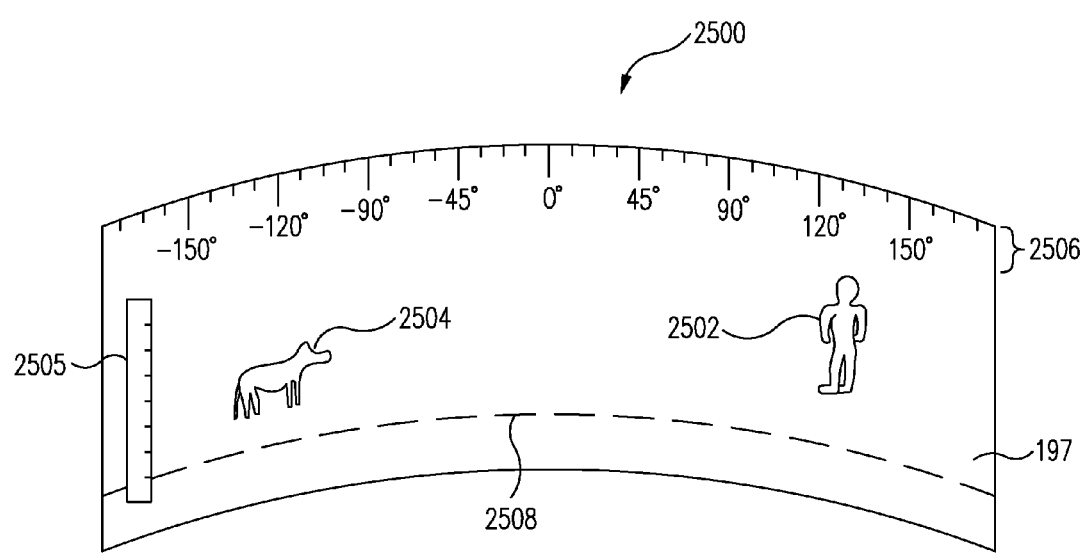
FIG. 21 illustrates information that may be displayed on a display of a wearable imaging device showing images of detected objects at various locations in accordance with an embodiment of the disclosure.

FIG. 21 shows a portion of a display for a wearable imaging device or wearable apparatus (e.g., display 197 of FIG. 1 or a projected image from pico-projector 1206) that is displaying a user-viewable image 2500 according to an embodiment. In one embodiment, radiometric data (e.g., temperature data) contained in the pixels of the thermal images captured by an infrared imaging module may be converted into gray-scaled or color-scaled pixels to construct an image such as image 2500 that can be viewed by a person. User-viewable thermal image 2500 may optionally include a legend or scale such as scale 2505 that indicates the approximate temperature of corresponding pixel color and/or intensity and an angular scale, such as scale 2506, that indicates the location of detected objects such as person 2502 and/or animal 2504. Such user-viewable images may be viewed by a user (e.g., a soldier, a law-enforcement officer, a firefighter or a hunter) to visually determine the location of potential threats even in dark environments (e.g., at night) or under obscured vision conditions (e.g., in a fog or in a smoke-filled environment).

If visible light images of the scene are available (e.g., captured by visible light camera 1406), a processor may be configured to superimpose, fuse, blend, or otherwise combine the thermal images and the visible light images to generate user-viewable image 2500 having a higher definition and/or contrast. For example, processor 195 may be configured to generate images 2500 that are combined images including radiometric data and/or other infrared characteristics corresponding to a scene, but with significantly more object detail (e.g., contour and/or edge detail) and/or contrast than typically provided by the thermal or visible light images alone, as further described herein. In another example, images such as image 2500 may be combined images that include radiometric data and visible light characteristics (e.g., a visible spectrum color) corresponding to one or more objects (e.g., a person) in scene, as described for appropriate embodiments disclosed in various patent applications referenced herein such as, for example, U.S. Patent Application Nos. 61/473,207, 61/746,069, 61/746,074, 61/792,582, 61/793,952, 12/766,739, 13/105, 765, or Ser. No. 13/437,645, or International Patent Application No. PCT/EP2011/056432, or others as appropriate. Combined images generated in these examples may provide sufficient radiometric data, edge detail, and contrast to allow easier recognition and/or interpretation of the presence, location, and position of a detected person 2502 or animal 2504.

As shown in FIG. 21, in some embodiments, a wearable apparatus, such as wearable imaging device 1700 or wearable apparatus 1200, may enable a user to define a virtual boundary 2508. A user may define virtual boundary 2508 through, for example, an interaction with a control panel, a GUI presented on display 197, or other input component. Virtual boundary 2508 may be defined by a user to delineate an area where it may be unsafe or otherwise undesirable for an approaching person to enter. For example, alerts may be generated if a person or other threat such as a fire enters the area inside virtual boundary 2508. In other embodiments, the detection may be performed using one or more image analysis operations (e.g., video analytics), which may include scene reconstruction operations, object tracking operations, and/or virtual tripwire detection operations. The example of a virtual boundary is merely illustrative. If desired, a wearable apparatus may generate an alert when a person, animal or other object, such as a fire, is detected at any location.

Figure 22:
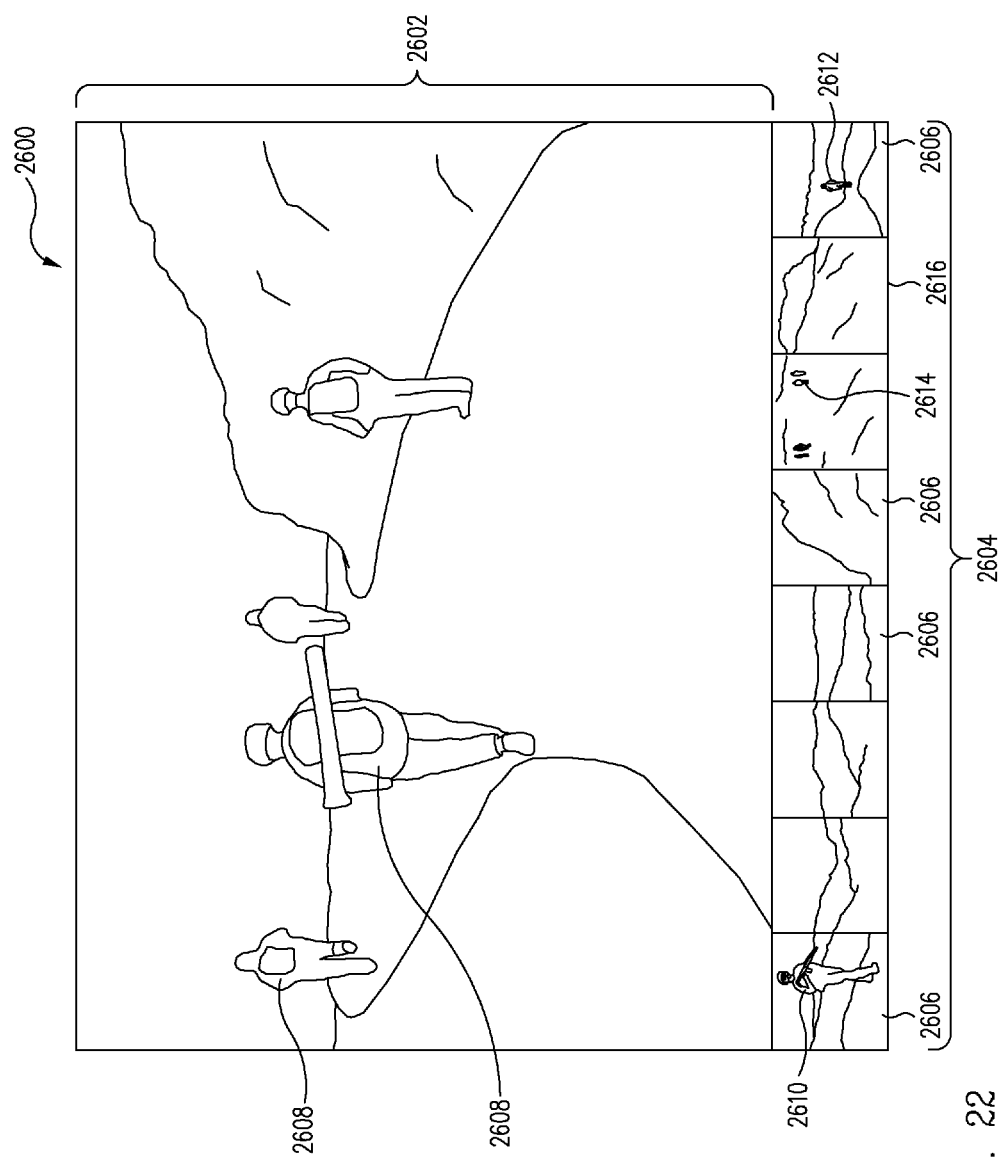
FIG. 22 illustrates information that may be displayed on a display of a wearable imaging device showing a primary image and a panorama image in accordance with an embodiment of the disclosure.

In some embodiments, a display of a fixed system or a portable device such as a wearable imaging device (e.g., display 197 of FIG. 1 or a projected image from picoprojector 1206) may be used to display multiple images from multiple respective infrared imaging modules, such as infrared imaging modules associated with imaging modules 1804 (see, e.g., FIGS. 14 and 15) or infrared imaging modules 1204 (see, e.g., FIGS. 19 and 20A) and/or nonthermal imaging modules. FIG. 22 shows one particular example of a portion of a display for a wearable imaging device or wearable apparatus displaying multiple infrared images from multiple respective infrared imaging modules according to an embodiment.

As shown in FIG. 22, a display of a wearable imaging device may be used to display a primary (forward-looking) user-viewable infrared image 2602 and a secondary panorama image 2604. Panorama image 2604 may include one or more individual user-viewable infrared images 2606. Primary image 2602 may be generated using thermal image data from a forward looking infrared imaging module, such as an infrared imaging module associated with imaging module 1502, or a forward looking infrared imaging module 1204. Images 2606 may each be generated using image data from an infrared imaging module 100 mounted around a periphery of a wearable imaging device that views a portion of a 360 degree panorama around the wearer of the wearable imaging device. Primary image 2602 may have a resolution that is higher than each individual image 2604, or may have the same resolution as one or more of images 2604. Images 2602 and 2606 may be arranged to correspond to various angular directions from 0° to 360° around the wearer.

Figure 23:
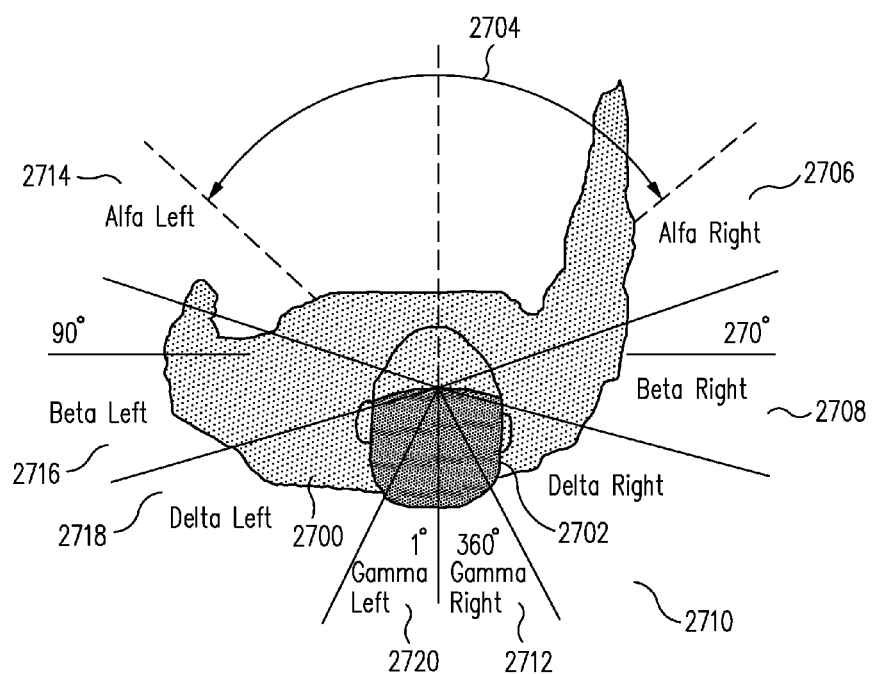
FIG. 23 illustrates various regions around a wearer of a wearable imaging device that can be imaged using imaging modules on the wearable imaging device in accordance with an embodiment of the disclosure.

Referring now to FIG. 23, the region around an observer 2700 of an image such as a wearer of a wearable imaging device 2702 may include a forward looking field of view 2704 and one or more peripheral fields of view such as, for example, peripheral fields of view 2706 (e.g., an Alpha Right or αR field of view), 2708 (e.g., a Beta Right or βR field of view), 2710 (e.g., a Delta Right or ΔR field of view), 2712 (e.g., a Gamma Right or γR field of view), 2714 (e.g., an Alpha Left or αL field of view), 2716 (e.g., a Beta Left or βL field of view), 2718 (e.g., a Delta Left or ΔL field of view), and 2720 (e.g., a Gamma Left or γL field of view). In the example of FIG. 23, the region around observer 2700 is divided into one forward looking field of view, four right looking fields of view, and four left looking fields of view. However, this is merely illustrative. In various embodiments, the region around an observer, a system, or a device such as a wearable imaging device and/or the wearer of such a device may be divided into any suitable number of fields of view that, for example, each correspond to the field of view of one or more imaging modules (e.g., in a fixed system or on a portable device such as a wearable imaging device).

Referring again to FIG. 22, image 2602 may include objects such as persons 2608 located generally in front of the wearer (e.g., in forward looking field of view 2704). Working right from the center of panorama 2604, in one simplified division of a distribution of images of a surrounding scene, images 2606 may include an αR, a βR, a ΔR, and a γR field of view as described in connection with FIG. 23. Working left from the center of panorama 2604, images 2606 may include an αL, a βL, a ΔL, and a γL field of view as described in connection with FIG. 23. Images 2606 may therefore include (as examples) an image of an object such as person 2610 located generally behind and to the left of the wearer, an image of an object such as a person 2612 located generally behind and to the right of the wearer, and/or images of other objects in other directions around the wearer such as persons 2614 located generally to the right of the wearer.

Images 2606 of panorama 2604 may be stitched together, may partially overlap, or may be separate images. Panorama 2604 may include substantially all of a continuous 360 degree view around the wearable imaging device, may include breaks in the coverage of the 360 degree field of view, may include portions of a field of view above and/or below the wearable imaging device or may be otherwise arranged to display a panoramic image such as a 360 degree field of view, hemispheric (e.g., 2π steradian) or larger field of view (e.g., up to 4π steradian) image of the surroundings of the wearable imaging device as desired. The examples of images 2602 and 2606 in FIG. 22 are shown in the context of a soldier on patrol. However, this is merely illustrative. In general, a wearable imaging device that captures and displays user-viewable thermal images can be used in various other scenarios, such as a scenario in which a firefighter whose vision is obscured due to smoke but can use a panoramic thermal image to quickly see hotspots in their perimeter using a wearable imaging device that displays images such as images 2602 and 2606.

In the example of FIG. 22, panorama 2604 is displayed below primary image 2602. However, this is merely illustrative. In various embodiments, one or more forward looking images and one or more peripheral or panoramic images can be displayed in any suitable arrangement for displaying images of an observers surroundings such as a wearer's surroundings as desired. In particular, improved situational awareness may be provided to a wearer of a wearable imaging device or a user of another display system by providing a panoramic image having a high resolution central portion and gradient compressed peripheral portions as described, for example, hereinafter.

Figure 24:
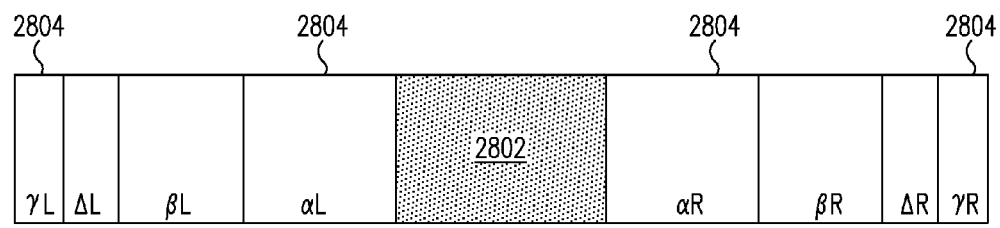
FIG. 24 is illustrates information that may be displayed on a display of a wearable imaging device showing a primary image and a panorama image in accordance with an embodiment of the disclosure.

FIG. 24 shows a portion of a display of a display system such as a display of a fixed camera surveillance system, a display of a virtual image display system, or a display of a portable imaging and display device such as a wearable imaging device that may be used to display a particular example of a panoramic image having a high resolution central portion and gradient compressed peripheral portions such as a horizontally compressed panoramic image 2800 that includes a primary (forward-looking) user-viewable image portion 2802 (e.g., a thermal and/or non-thermal image) and one or more peripheral user-viewable image portions 2804 (e.g., thermal and/or non-thermal image portions) arranged on two opposing sides of primary image portion 2802.

In one embodiment, primary image 2802 may represent a portion of a scene located in front of the wearer (e.g., a primary camera such as imaging module 1502 (see, e.g., FIG. 15)). As discussed below, peripheral images 2804 may be spatially compressed and displayed on either side of primary image 2802, thereby enabling a wearer to have a 360 degree view of the surrounding environment. Peripheral images 2804 may each be compressed by a corresponding compression amount for that image that is based on an overall compression gradient for images 2804 and/or each peripheral image 2804 may be gradiently compressed according to a compression gradient within the peripheral image (e.g., by progressively compressing a peripheral image by a continuously increasing amount from one side of the image to the opposing side of the image). The distance from primary image 2802 corresponds to an angular distance from a forward looking direction of the wearable imaging device. A compression gradient of this type may therefore present a 360 degree view in which peripheral portions of the view are increasingly compressed, based on the angular distance from the forward looking direction. The spatial compression gradient may, for example, be a continuous gradient across multiple peripheral images that increases with increasing angular distance from the forward looking direction or with increasing distance from the primary image.

In this way, an image having the greatest detail may be displayed in the main (primary) view, while allowing for 360 degree detection of movement, objects, and the like, using a panoramic image all on a single display. Peripheral images 2804 (e.g., alpha-gamma images to the left and to the right) may be spatially compressed into fewer pixels and arranged on the ends of the primary image 2802 (e.g., using pixel mapping procedures as would be familiar to one skilled in the art). In one embodiment, peripheral images 2804 may be continuously and progressively more compressed based on the angular position of the image from alpha through gamma. To prevent the loss of indicative information caused by a down sampling compression, during spatial compression operations, brighter pixels may be given priority and may be used as a signal that movement or objects are present in a section of a peripheral image corresponding to those pixels. The compression gradient beyond the forward viewing section 2704 based on the angular position of an imaging module and the resulting angular position of the corresponding peripheral image from that module can provide enhanced detail in the area closest to the center of the viewing area and can reduce large jumps in detail when the viewer pans the front camera. Peripheral images 2804 may be compressed according to a linear compression gradient or the compression gradient may be a compression gradient that approaches a tangent as the images approach a forward looking direction of a forward looking image in the forward viewing area 2704 (as examples).

If a "trigger" or an indicative event (e.g., a viewed image of a person or a detected object alert) occurs in a particular portion of a field of view around a wearable imaging device (e.g., a portion such as section ΔR), the wearer could turn their head right and focus the primary forward looking camera on the event trigger. In one embodiment, images 2802 and 2804 may be captured by a fixed disk of infrared cameras having a common high resolution. In this type of arrangement, when an indicative event occurs in a particular portion such as section ΔR, the associated imaging module (e.g., the imaging module that captured the ΔR image) can be assigned to be the primary imaging module so that the primary image can be used to display an image associated with the camera trigger event.

Figure 25:
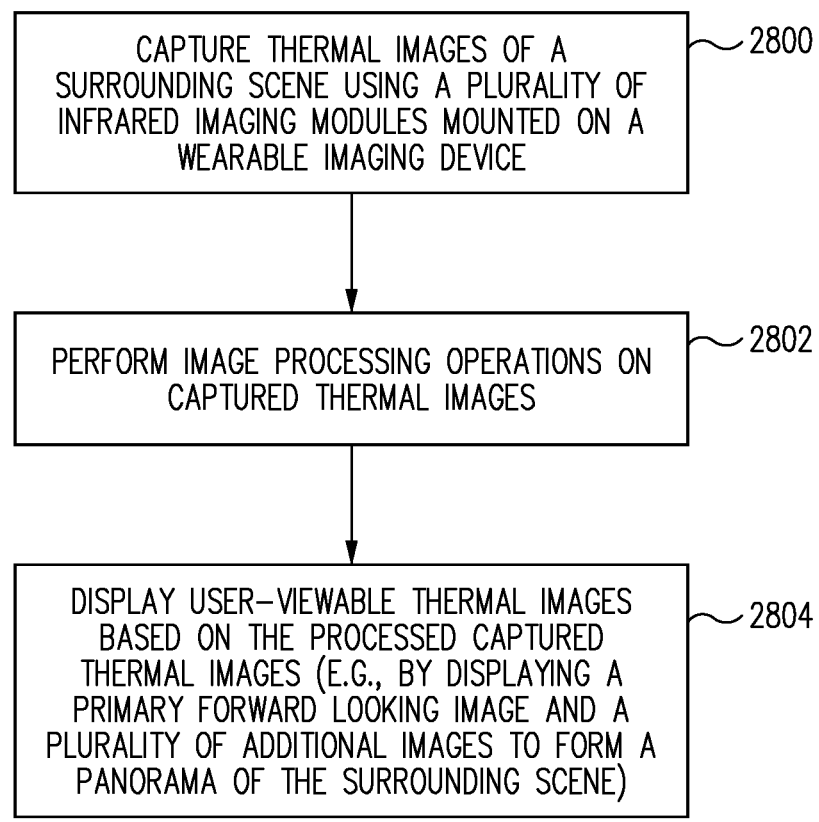
FIG. 25 illustrates a process for capturing and displaying thermal images using a wearable imaging device in accordance with an embodiment of the disclosure.

Referring now to FIG. 25, a flowchart is illustrated of a process for capturing and displaying thermal images and/or non-thermal images using any imaging and display system having one or more thermal and/or non-thermal imagers configured to capture images of the environment surrounding the system such as any of the wearable imaging devices disclosed herein (e.g., wearable imaging device 1700 of FIG. 13 or wearable apparatus 1200 of FIG. 19).

At block 2800, thermal images of some or all of a surrounding scene may be captured using a plurality of infrared imaging modules mounted on a wearable structure of a wearable imaging device such as a multidirectional threat monitoring helmet or a SCBA. In some embodiments, non-thermal images may also be captured using the wearable imaging device. Although the example of block 2800 is described in connection with imaging modules of a wearable imaging device, images such as thermal and/or non-thermal images may be obtained from any imaging modules (e.g., imaging modules of a fixed installation or an asset) or from an external system. The obtained images may be individual images or may be previously stitched images.

At block 2802, imaging processing operations of the type described herein may be performed on the captured thermal images. As examples, image processing operations may include NUC corrections, other noise corrections, calibration operations, smoothing operations, filtering operations, edge detection operations, perspective calibration operations, stitching operations (e.g., if the acquired images have not already been stitched), panorama arrangement operations, compression operations, mapping operations, and/or other image processing operations. Additional processing operations may also be performed on visible light images optionally captured at block 2800. In some embodiments, image processing operations performed at block 2802 may include combining or fusing thermal images and visible light images. NUC correction processes may be performed on the captured thermal images to remove noise therein, for example, by using various NUC techniques disclosed herein. Image processing operations may include noise corrections, calibration operations, smoothing operations, filtering operations, edge detection operations, perspective calibration operations, stitching operations (e.g., if the acquired images have not already been stitched), panorama arrangement operations, compression operations, mapping operations, and/or other image processing operations using non-thermal images such as visible light images, thermal images, and/or combined (e.g., fused) thermal and non-thermal images. For example, image processing operations may include applying a mapping function to the images to reduce the horizontal and/or vertical resolution of portions such as peripheral portions of a stitched image to generate a panoramic image having a high resolution central portion and gradient compressed peripheral portions.

At block 2804, images such as user-viewable thermal images based on the processed captured thermal images, visible light images, and/or combined thermal and non-thermal images may be displayed using a display of the system such as a display of a wearable imaging device (e.g., by displaying a primary forward looking image and a plurality of peripheral images to the primary image that form a panorama of the surrounding scene such as the panoramic image having a high resolution central portion and gradient compressed peripheral portions). The images may be displayed as described herein in connection with, for example, FIGS. 21, 22, 23, 24, 27A-27C, 28A-28C, 29 and/or 30.

Figure 26:
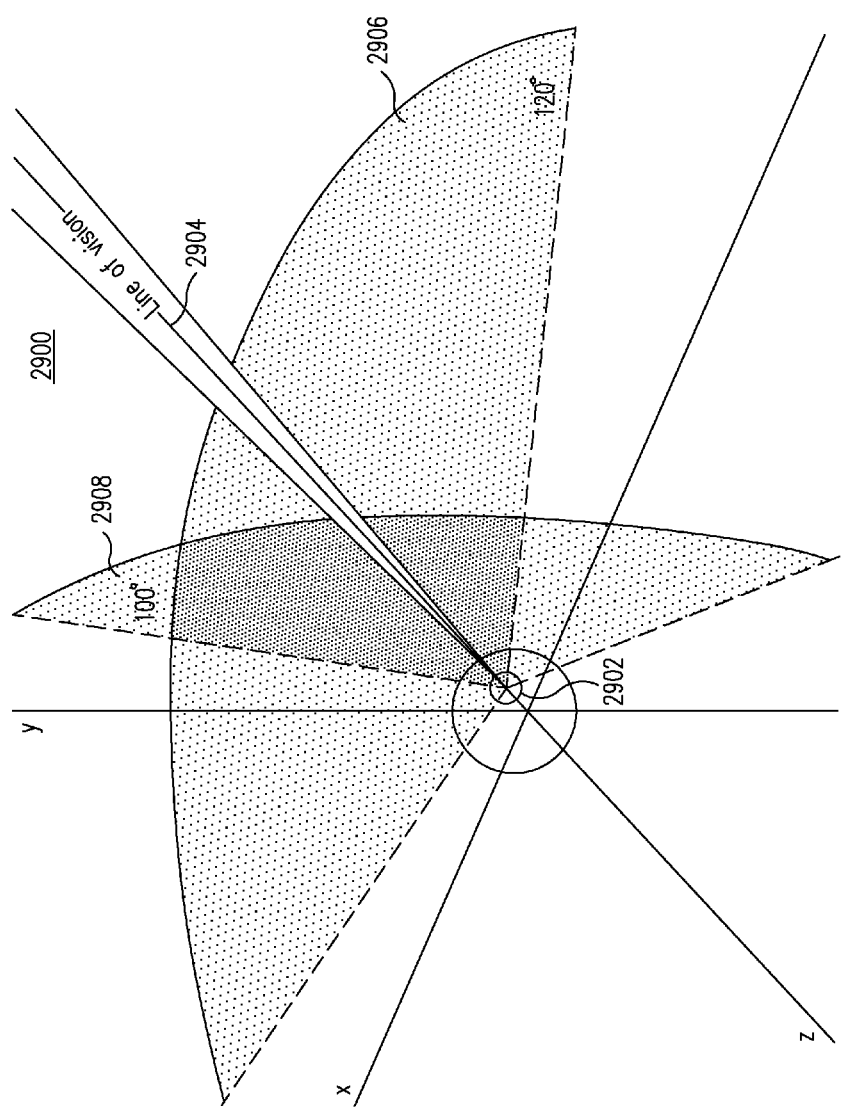
FIG. 26 is a diagram illustrating line-of-sight and peripheral vision of a typical human eye.

As illustrated in FIGS. 23 and 26, a human eye 2902 operating in conjunction with an associated brain sees a field of view (FoV) 2900 that is characterized by a central view along a high resolution but very narrow "line of sight" 2904 that is surrounded by a "peripheral view" region that is substantially larger in size but of substantially lower resolution and ability to perceive color and shape. Thus, as illustrated in FIG. 26, as measured in a horizontal or transverse plane 2906 passing through the eye 2902, the peripheral vision of the eye extends through an arc of about 120 degrees, and as measured in a vertical or sagittal plane 2908 through the eye 2902, extends through an arc of about 100 degrees.

In accordance with embodiments of this disclosure, display methods and apparatus can be provided for enhancing human situational awareness. In a manner similar to that in which the human eye 2902 and brain see surroundings, an expanded FoV image may be displayed, in which the highest resolution portion of the image is provided in a central or foveal field of acute focus of the display, whereas, areas adjacent to this field, e.g., far peripheral vision at the edges of the FoV, mid-peripheral vision in the middle of the FoV, and near-peripheral, or para-central vision, immediately adjacent to the central field, are reduced in resolution, i.e., compressed. However, because the imaging systems described herein, for example, a fixed installation system or the wearable systems above, are not limited to one or two sensors, the resolution for a 360 degree FoV display is intentionally reduced to provide detail where it is desired, e.g., in the central field, but also to provide the viewer with a full 360 degrees of situational awareness, (e.g., to provide a viewer with virtual "eyes in the back (and/or on top) of the viewer's head)."

In some embodiments, several separate cameras provide 360 degree FoV information to the display processor. However, displaying all the data provided by these is impractical, since it would require an impractically large display and/or would reduce resolution so that important details would be completely lost. However, in accordance with embodiments of the present invention, video data in the "focus view" (usually directly in front of the user) are displayed in high definition (also referred to as high resolution or high detail, e.g., in comparison with the definition, resolution, or detail of surrounding portions of the view). However, the video of areas to the left and right of the focus view, as well as those above and below, are gradiently compressed, thereby providing a view that is relatively easy to fit on an average or small display, yet provides high resolution in areas of interest and enables full 360 degree situational awareness in a way that the human brain is used to interpreting. For example, as discussed above, the compressed side regions can be used to look for "triggering events," i.e., motion, heat and the like, and can "flare" the display area to invite the user's attention to such an event. The user can then select that area as the higher resolution view, e.g., by touching the screen at the indicated area, moving a joystick to move the higher resolution view, using keyboard inputs to move the higher resolution view, using a mouse to move the higher resolution view, moving a portable device to move the higher resolution view, or in a wearable embodiment, turning the user's head toward the indicated area.

It should be understood that this technology can be used in the consumer market utilizing existing camera towers and infrastructure to create portable image display software such as a smart phone "app." The app or an internet site could be used to view traffic or crowd conditions, watch tornados, view one's child at daycare, and the like. Additionally, it can also be used in commercial situation awareness settings including racing, paintball games, other gaming, and the like.

In accordance with an embodiment of the present disclosure, methods are provided for displaying wide FoV information up to and including a 360 degree panoramic view from a suite of fixed cameras and a centralized, high-detail "focus view" within the same image. In various embodiments, the centralized, high detail focus view can be provided by a forward-looking camera having a resolution that is higher than the resolution of cameras that view surrounding portions of the scene or the forward-looking camera can have the same resolution as the surrounding cameras and the resolution of the images from the surrounding cameras can be reduced during image processing operation while leaving the forward-looking camera images at full resolution. The goal is to present the images in such a way that the brain's near-, mid-, and far-peripheral vision processing allows for seamless, natural integration of all available image data while enabling the eye and brain to concentrate primarily on a region of interest. In other words, an object of this disclosure is to improve an operator's situational awareness using panoramic images up to and including 360 degree panoramas, full $2\pi$ steradian panoramas and full $4\pi$ steradian panoramas, and possibly, to reduce operation fatigue that can occur if care is not taken from information overload when trying to view conventional wide FoV information. As discussed above, other systems attack the situational awareness problem by putting more information in front of an operator. A key aspect of the methods of this invention is that they actually discard data, even shape or color information data, to increase the number of pixels in the region of interest, while maintaining situation awareness in the other areas under surveillance, and then integrate this data into a single, comprehensible display instead of separate controls, like a HUD and video.

This disclosure contemplates at least four example usage scenarios: 1) a wearable system, 2) an asset-mounted system, 3) a site installation system, and 4) a virtual image display system. As discussed above in connection with, e.g., FIGS. 14 and 15, in scenario 1), image sensors (with varying or similar resolution) are mounted on an accessory, such as a helmet or a jacket, or alternatively, can be strapped directly onto a wearer's body with, e.g., a harness. These systems are used primarily by the wearer. For example, in the case of a helmet, a true heads-up display (HUD) is created, and the focus view is always a forward-facing one. In one possible embodiment, the focus view could possibly be from a high resolution forward-facing camera in a multi-camera system utilizing cameras with varying resolutions. In this regard, it should be understood that the use of the high-resolution view does not imply that the sensors need have differing resolutions. Indeed, all the sensors can have the same resolution, all can have different resolutions, or some can have the same resolution and others a different resolution.

In scenario 2), image sensors are mounted onto an asset, such as a vehicle, ship, aircraft, crane, forklift, semi-truck, boat, ship, or airplane. The user(s) of the system may be collocated with the asset, for example, a crane operator or forklift driver, or alternatively, remote from the asset, such as a harbor master verifying visibility from an arriving ship's perspective. If the image sensors are of sufficiently high quality, they can be used to generate the detailed view, and if not, a higher-quality pan/tilt camera can be used for this purpose. This implementation of the invention could be applied to an existing system to improve usability, even when safety and information overload are not an issue. Adding the compressed display would result in a system that requires less effort to use and archives equivalent results. In scenario 3), image sensors are mounted onto a fixed installation such as a camera system for a military base, a nuclear power plant, a prison, an airport, a tower, a bridge such as a lift bridge, a home, a business, or other fixed location. This arrangement can be used, for example, to aid law enforcement or security forces to police, secure, or defend a location. It could also be used, for example, by homeowners to surveil their own homes, either while there or away. Beyond safety driven applications, all three scenarios can be applied to new social media applications, ranging from path guidance to assisting with a group of people interacting within a larger crowd. More generally, the panoramic image generation processes and systems disclosed herein can be used to generate panoramic images using images from any suitable sources such as images provided from an external imaging system to a panoramic display system or using virtual images such as images generated by a gaming system.

For example, in scenario 4), modeled images, simulated images, or other virtual or semi-virtual images may be generated by one or more processors associated with the display system or separate from the display system and provided to the display system to generate and display panoramic images for visualization, modeling, simulation, and/or gaming activities. In general, panoramic images having a central focus view and gradient compressed peripheral regions may be generated using individual and/or stitched images (e.g., captured or generated) from any image source regardless of the method being used to create the source images.

Figure 27:
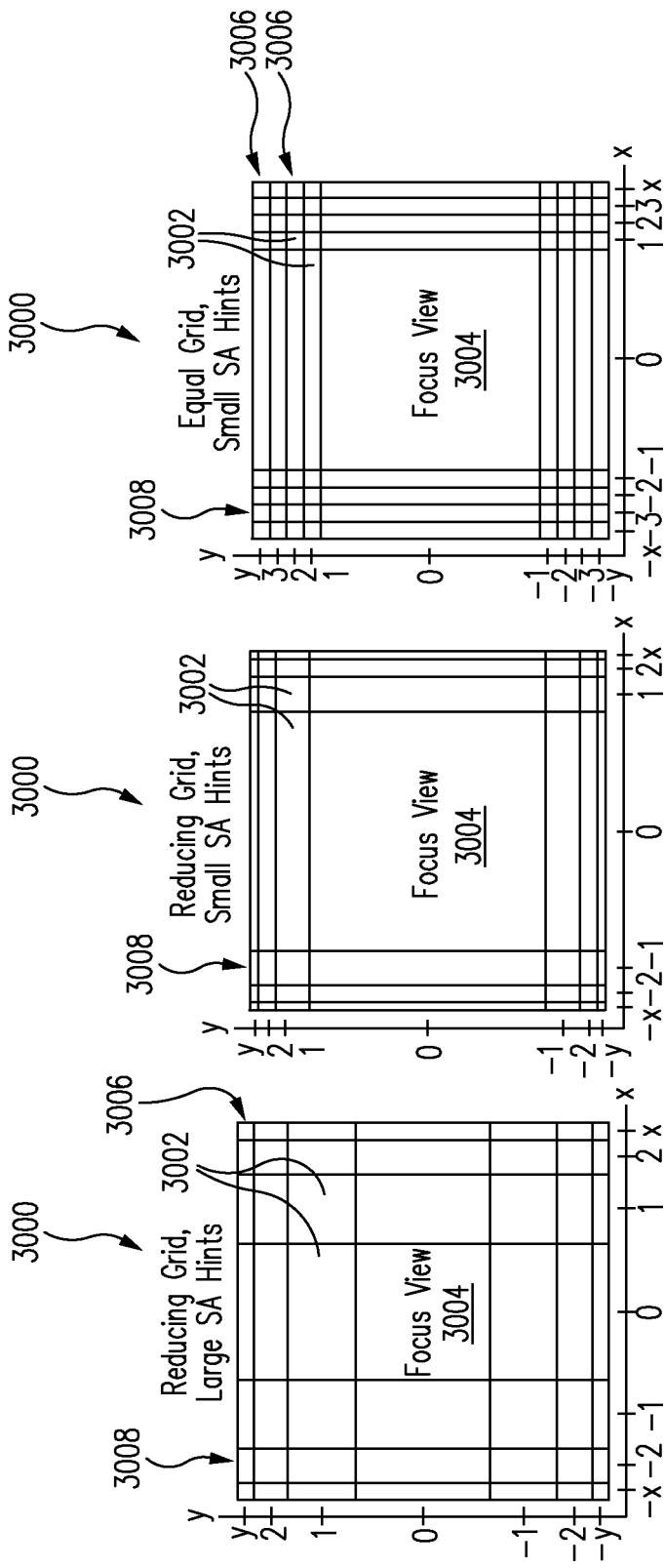
FIGS. 27A-27C are diagrams illustrating different methods for dividing a panoramic image into cells having varying amounts of horizontal and/or vertical compression.

As illustrated in FIGS. 27A-27B, in some embodiments, a generally rectangular or square display 3000 of a panoramic image is broken down into a grid defining a plurality of cells 3002, with the center grid cell 3004 being the focus view and having the best or highest detail. As discussed above in connection with FIG. 24, the size of the focus view 3004, number of bands such as horizontal bands 3006 and vertical bands 3008 for the remaining information, and the relative size of the bands 3006 and 3008, and hence, cells 3002 to each other can be configured to provide for a number of possible tradeoffs, for example, between maximizing the focus view area 3004 and the amount of information to be provided outside of the focus view area 3004, and further, if more information is to be provided for areas closer to the focus view area 3004 than to areas further away from it. If, for example, high detail image sensors are being used, or if pan/tilt/zoom images are used, then the focus view 3004 can be moved and/or zoomed. This movement can be automated, for example, and applied by an outside system or an algorithm, or alternatively, under an operator's control.

As shown in FIG. 27A, image cells 3002 that are adjacent to the focus view 3004 may be relatively comparable in size to the focus view 3004 with cells located further from the focus view being increasingly smaller in size. As shown in FIG. 27B, image cells 3002 that are adjacent to the focus view 3004 may be substantially smaller in size in one or more dimensions than the focus view 3004 with cells located further from the focus view being increasingly smaller in size. As shown in FIG. 27C, image cells 3002 that are adjacent to the focus view 3004 may be substantially smaller in size in one or more dimensions than the focus view 3004 with cells located further from the focus view having substantially equal size to the size of the cells adjacent to the focus view.

Figure 28:
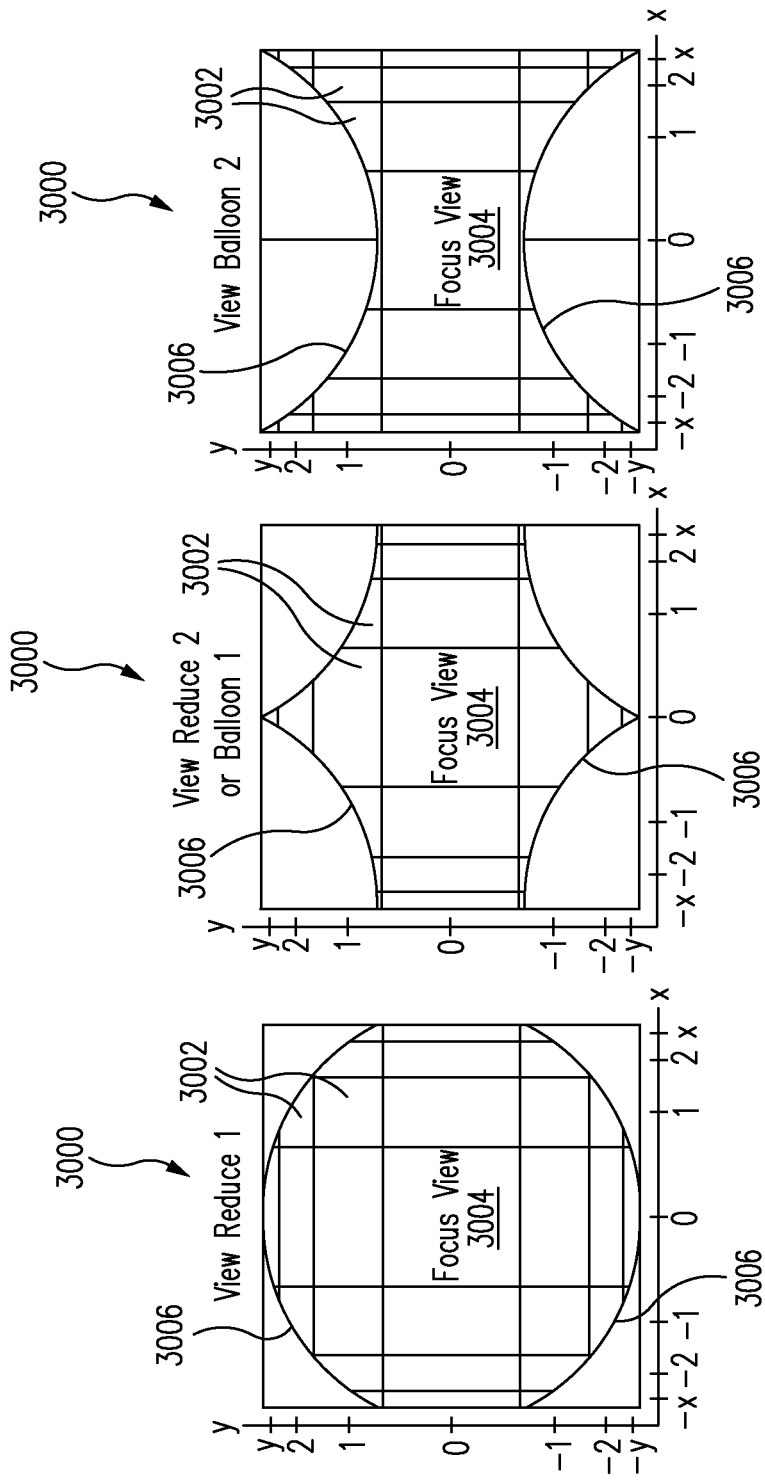
FIGS. 28A-28C are diagrams illustrating other methods for dividing a panoramic image into cells having varying amounts of horizontal and/or compression for tuning near-, mid-, and far-peripheral vision response.

In the embodiments illustrated in FIGS. 27A-27C, the output display 3000 of the panoramic image is generally rectangular in shape, but as illustrated in FIGS. 28A-28C, depending on the size of the display 3000 and the distance between the display 3000 and the user, other patterns and shapes for the displayed panoramic image can be used to better tune the near-, mid-, and far-peripheral vision response. For example, as illustrated in FIG. 28A, the data of the image in the upper and lower peripheral areas can be compressed such that the image in these areas appears to be bounded by semi-circular arcuate boundaries 3006. As illustrated in FIGS. 28A-28C, the size, shape and location of these boundaries 3006 can be varied, depending on the particular application at hand. The panoramic displays of FIGS. 27A-27C treat information across a particular band as equally important. However, the panoramic images of FIGS. 28A-28C may reduce and/or increase the effect or emphasis of information in various portions of the peripheral vision (e.g., by reducing or increasing the number of vertical pixels at the edges of the image). The examples of FIGS. 28A and 28B can be particularly useful in situations in which the image is zoomed, but compressed bands around the focus area would benefit from extra emphasis over the flat gradients shown in FIGS. 27A-27C. Gradient compression patterns such as the compression patterns shown in FIGS. 28A-28C may allow the compressions and peripheral triggers to be tailored for individual operators. In this regard, some consideration should be made to the types of cameras incorporated in the system. Generally, it is desirable to create rectilinear images. This indicates that features in the image with straight edges (e.g., walls) should be rendered as straight lines. So-called "fisheye views," while panoramic in nature, tend to distort straight edges, mainly because they utilize only one or relatively few cameras and do not take into account the operational fatigue of the user that can be induced by distorted images.

In the case of scenario 1), i.e., a wearable solution, e.g., a helmet with sensors using fixed FoVs mounted thereon, the grid can be simplified and the display broken up into corresponding vertical bands, each of which maps to an angular offset from the center of focus, as discussed above in connection with FIGS. 23 and 24.

Of importance, in accordance with embodiments of the present invention, the degree of horizontal and vertical compression of the panoramic view is non-constant. That is, the view is uncompressed (or is uniformly compressed for zooming out, but maintaining a rectilinear image) at the boundary between the alpha bands and the central focus view band (or as illustrated in FIG. 24, transition between the cell 0 and +/−1 cells) and is highly compressed in the gamma bands. Additionally, the gradient of the compression is continuous, that is, there are no discontinuities in the image in which the compression changes suddenly. Rather, there is only a gradual reduction in detail from the central focus view to the right and left edges of the peripheral display.

In any of the above installation scenarios, the focus view will be selected either by interacting with the screen (through, e.g., a mouse, joystick, touch-screen), by eyeball-tracking hardware, or triggers from external systems.

It should be noted that the above-described mapping functions can solve more than one problem, including spatial and zoom problems. For example, in one spatial problem, the need is to present a panoramic image that is larger than a display capable of 1-to-1 pixel mapping while providing as much detail (e.g., 1-to-1 pixel representation) for the region of interest. The second problem is providing video at different resolutions. However, in this regard, it is possible to use the resolution mapping function twice; once to combine the images at different resolution, and a second time to adjust for display, without having to resort to any optimization techniques or algorithms.

In another embodiment, the foregoing compressed display could be used as a replacement for a rearview mirror. Since it is not limited to the functional location of current rearview mirrors, this display can be located closer or within the FoV of the driver. In some embodiments, when the turn signal is engaged, the display could automatically focus on the corresponding side-mirror view, but one that eliminates the driver's "blind spot."

Figure 29:
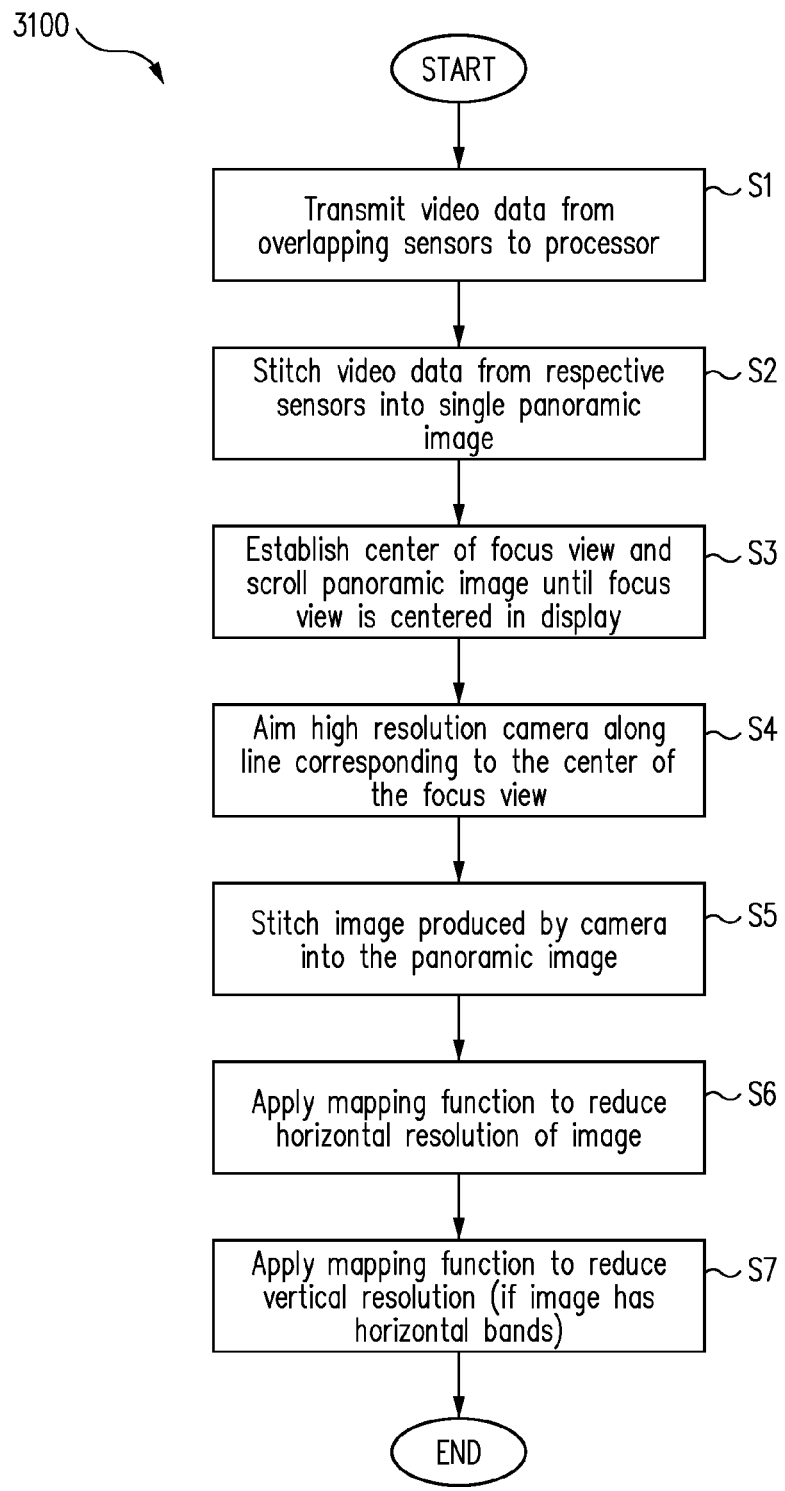
FIG. 29 is a block diagram illustrating steps of an example method for generating an enhanced a panoramic display.

As illustrated in FIG. 29, in accordance with the foregoing, one example embodiment of a simplified method 3100 for generating compressed panoramic view images can comprise the following steps:

S1—Transmitting video to a processor from multiple sensors, wherein the sensors' respective fields of view have sufficient overlap to enable stitching of images from the sensors into a single panoramic image;

S2—Stitching the video data from respective ones of the sensors into a single panoramic image;

S3—Establishing the center of the focus view (e.g., in a fixed forward direction for HUD applications such as a helmet mounted display and sensors or a user-selected direction for other applications) and scrolling the panoramic image such that the focus view is centered in the display;

S4—Aiming a camera along a line corresponding to a center of the focus view (e.g., a fixed camera such as a forward looking one of the multiple sensors for HUD applications or a pan/tilt camera for other applications). In some scenarios, the camera may already be aimed at the center of the focus view. In other scenarios, aiming the camera may include moving a pan/tilt camera, turning the head of a wearer of wearable imaging device, or otherwise moving the camera into alignment with the center of the focus view. The camera may be one of the multiple sensors or may be a separate camera such as a relatively higher resolution camera;

S5—Stitching the high-resolution image produced by the camera into the panoramic image;

S6—Applying a mapping function to reduce the horizontal resolution of the image; and S7—Repeating the immediately preceding step to reduce the vertical resolution of the image if the image has horizontal bands.

In the foregoing example method 3100, the mapping function should include the following characteristics:

1. Near the center of the output view, the pixels should map 1-to-1 from the stitched panoramic view to the output view;

2. Near the edges of the output view, the pixels should map many-to-1 from the stitched panoramic view to the output view;

3. The degree of compression should increase smoothly from the center to the edges of the output view;

4. At least within at least the focus area, the image should be substantially rectilinear.

Figure 30:
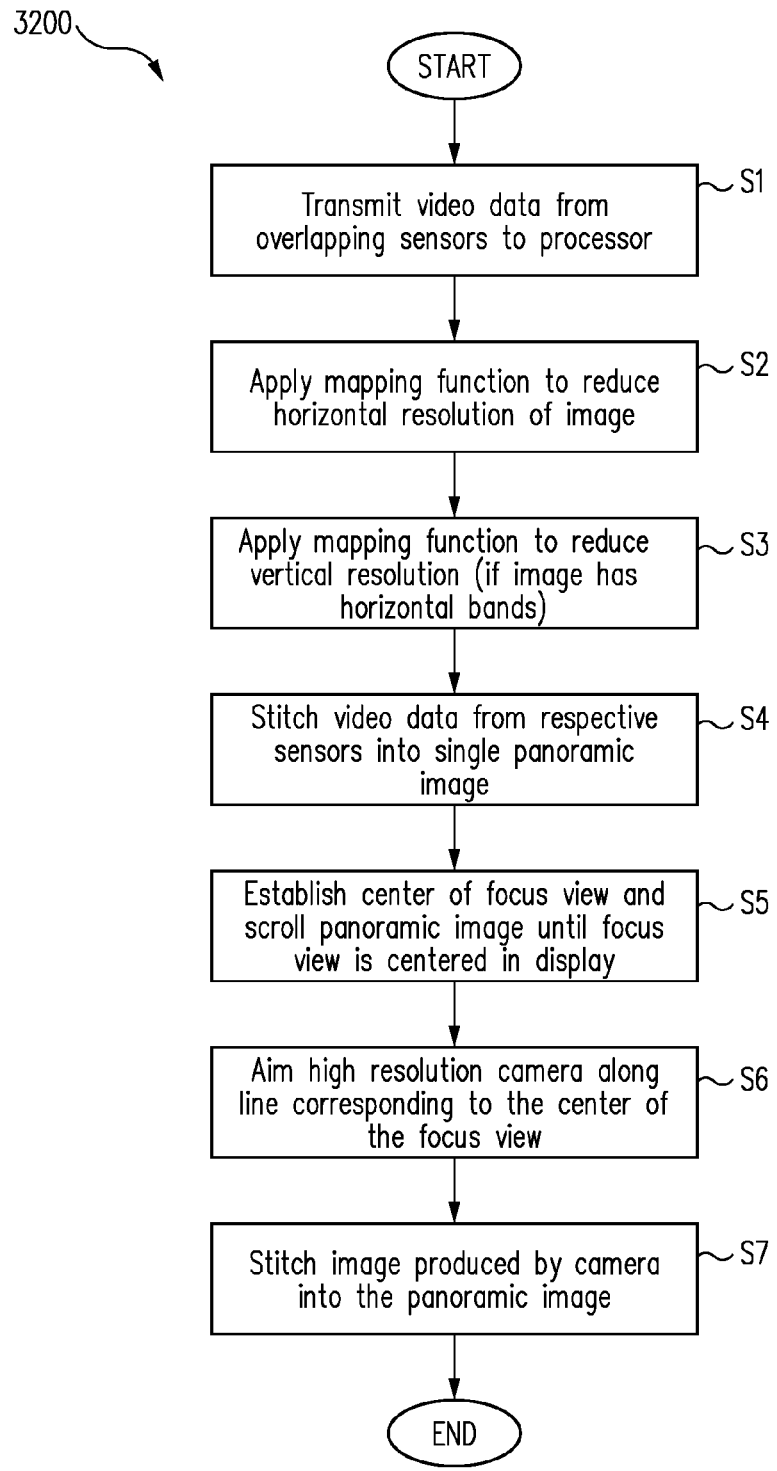
FIG. 30 is a block diagram illustrating steps of another example method for generating an enhanced a panoramic display.

A second simplified method 3200 for generating the compressed panoramic views involves mapping the compressed views before stitching them to each other or to the high-resolution central view. Thus, as illustrated in FIG. 30, the second simplified method 3100 can comprise the following steps:

S1—Transmitting video images to a processor from multiple sensors, wherein the sensors' respective fields of view have sufficient overlap to enable stitching of images from the multiple sensors into a single panoramic image;

S2—Applying a mapping function to reduce the horizontal resolution of at least some of the images;

S3—Repeating the immediately preceding step to reduce the vertical resolution of at least some of the images if the panoramic image is to have horizontal bands.

S4—Stitching the video data (e.g., the reduced-resolution images) from respective ones of the sensors into a single panoramic image;

S5—Establishing the center of the focus view (e.g., as described herein) and scrolling the panoramic image such that the focus view is centered in the display;

S6—Aiming a camera along a line corresponding to a center of the focus view (e.g., as described herein in connection with FIG. 29); and S7—Stitching the high-resolution image produced by the camera into the panoramic image.

In other simplified methods for generating the compressed panoramic views, individual images and/or stitched images may be received from other systems and a selected mapping function as described herein may be applied to the received images to generate the panoramic image.

For example, in an embodiment in which a display system is implemented according to scenario 1) (e.g., as a part of a wearable imaging system such as a system for a firefighter, soldier, etc.), a method for generating gradient compressed panoramic images may include transmitting images to a processor from multiple fixed imagers on the wearable device, where the imagers' respective fields of view have sufficient overlap to enable image stitching to create a single panoramic image. As discussed herein, in accordance with some embodiments, a forward-facing imager of the imagers may have a higher resolution than other images or may have the same resolution as other imagers. The method may further include stitching the images into a single panoramic image such that the forward view is centered in the stitched panoramic image. The method may further include applying a mapping function to reduce the horizontal and/or vertical resolution of the panoramic image as discussed herein in connection with, for example, FIGS. 27A-27C and 28A-28C.

As another example, in an embodiment in which a display system is implemented according to scenario 2) (e.g., as a part of an asset such as a vehicle such as a crane, forklift, car, bus, semi-truck, boat, ship, airplane, or the like), the method may include transmitting images to a processor from multiple fixed imagers, where the imagers' respective fields of view have sufficient overlap to enable combining the images into a single panoramic image. As in the above example method for scenario 1), the forward-facing imager may have a higher resolution than the other imager or the same resolution. The method may further include stitching the images into a single panoramic image such that the forward view is centered in the image. A pre-calculated pixel transformation may be used to reduce processing requirements. The method may further include applying a mapping function to the panoramic image that reduces the horizontal and/or vertical resolution of a resulting gradient compressed panoramic image as discussed herein in connection with, for example, FIGS. 27A-27C and 28A-28C. Additional information such as position, orientation, and/or location information from other asset sensors may also be used to determine the shape, compression, and/or mapping for the panoramic image. For example, in implementations in which the display system is part of an imaging and display system for a crane, external information include tipping angles for the crane can additionally be included and used to add more detail to the panoramic image.

As another example, in an embodiment in which a display system is implemented according to scenario 3) (e.g., as a part of a fixed site installation such as a military base, a nuclear power plant, a prison, an airport, a bridge or the like), the method may include transmitting images to a processor from multiple fixed and/or pan-zoom-tilt (PTZ) imagers. The imagers' respective fields of view may have sufficient overlap to enable stitching of the images. The images may be either outward-facing or inward-facing, as from a perimeter fence. The method may further include, based on feedback from the user, updating the direction and/or zoom level for the high-detail area of the image. The method may further include, if a PTZ imager is available and can improve the high-detail area, tasking the PTZ imager and including the images from the tasked PTZ imager for processing. The method may further include applying a mapping function to the images that reduces the horizontal and/or vertical resolution of a resulting panoramic image as discussed herein in connection with, for example, FIGS. 27A-27C and 28A-28C.

As another example, in an embodiment in which a display system is implemented according to scenario 4) (e.g., as a display system for virtual images such as modeled or simulated images), the method may include receiving a panoramic image from a modeling engine and applying a mapping function to the received panoramic image that reduces the horizontal and/or vertical resolution of the panoramic image as discussed herein in connection with, for example, FIGS. 27A-27C and 28A-28C.

As another example, a display system may be implemented as an application (app) on a device such as a mobile device (e.g., for devices of each of a number of life guards watching a beach using a fixed infrastructure of imagers). In this app scenario, the method may include transmitting images to a processor from multiple imagers, where the imagers' respective fields of view have sufficient overlap to enable image combining the images into a single panoramic image. The method may further include stitching the images into a single panoramic image such that a forward view is centered in the image. A pre-calculated pixel transformation may be used to reduce processing requirements. Each user (or app) may have a unique forward view (e.g., a forward view centered on that user or on the device of that user). The method may further include applying a mapping function the panoramic image that reduces the horizontal and/or vertical resolution of the panoramic image as discussed herein in connection with, for example, FIGS. 27A-27C and 28A-28C.

In accordance with an embodiment, a method for displaying a panoramic view image is provided that includes obtaining a panoramic image having a center and side edges disposed on opposing sides of the center; defining a focus view and first peripheral portions of the panoramic image, wherein the focus view is a central focus view disposed around the center of the panoramic image and wherein the first peripheral portions are located between the central focus view and the side edges; and applying a mapping function to the panoramic image to compress at least some of the first peripheral portions to reduce at least a horizontal resolution of the panoramic image in the first peripheral portions.

According to another embodiment, the obtaining of the panoramic image includes receiving the panoramic image from an external system.

According to another embodiment, the receiving of the panoramic image from the external system includes receiving a stitched image or a virtual image from the external system.

According to another embodiment, the obtaining of the panoramic image includes transmitting video data from a plurality of sensors to a data processor and stitching the video data from respective ones of the sensors to form the panoramic image with the data processor.

According to another embodiment, the method further includes scrolling the panoramic image such that the focus view is centered in a display; aiming a camera along a line corresponding to a center of the focus view; and stitching an image produced by the camera into the panoramic image.

According to another embodiment, the sensors' respective fields of view have sufficient overlap to enable the stitching of the video data to form the panoramic image.

According to another embodiment, the panoramic image includes upper and lower edges disposed on opposing sides of the center and running between the side edges; the panoramic image includes second peripheral portions; the second peripheral portions are located between the central focus view and the upper and lower edges; the panoramic image includes horizontal bands; and the applying further includes applying the mapping function to reduce a vertical resolution of the panoramic image in the second peripheral portions.

According to another embodiment, the mapping function maps the panoramic image to a display having an output view having pixels for displaying the panoramic image such that: near a center of the output view, pixels of the panoramic image map 1-to-1 to the output view; near edges of the output view, the pixels of the panoramic image map many-to-1 to the output view; an amount of compression of the panoramic image increases smoothly and continuously from the center of the output view to the edges thereof; and within at least the focus view, the panoramic image is substantially rectilinear.

According to another embodiment, the mapping function maps the panoramic image to a display having an output view having pixels for displaying the panoramic image such that: near a center of the output view, pixels of the panoramic image map N-to-1 to the output view; near edges of the output view, the pixels of the panoramic image map M-to-1 to the output view; M is greater than N so that an amount of compression of the panoramic image increases smoothly and continuously from the center of the output view to the edges thereof; and within at least the focus view, the panoramic image is substantially rectilinear.

According to another embodiment, the focus view is selectable by a user or by an external system.

According to another embodiment, the panoramic image includes a plurality of virtual vertical bands and a plurality of virtual horizontal bands, each of the vertical and horizontal bands including: the focus view, a pair of near-peripheral bands disposed adjacent to and on opposite sides of the focus view, a pair of mid-peripheral bands disposed adjacent to and on opposite sides of the near-peripheral bands, and a pair of far-peripheral bands disposed adjacent to and on opposite sides of the mid-peripheral bands, and where: the horizontal and vertical bands define a plurality of cells disposed adjacent to each other, an amount of compression of data in any given cell is different from that of any adjacent cell and increases monotonically from that in a cell corresponding to the focus view of the panoramic image to cells disposed adjacent to edges of the panoramic image, and the panoramic image is free of discontinuities in which the compression of the data changes suddenly.

According to an embodiment, an system is provided that includes a display; a data processor disposed in data communication with the display; a camera disposed in data communication with the data processor; a plurality of sensors disposed in data communication with the data processor; and a non-transitory machine readable medium comprising a plurality of machine-readable instructions which, when executed by the processor, cause the processor to perform a method including stitching video data from respective ones of the sensors into a single panoramic image; establishing a focus view of the panoramic image; scrolling the panoramic image such that the focus view is centered in the display; aiming a camera at a center of the focus view; stitching a high-resolution image from the camera into the panoramic image; and applying a mapping function to the panoramic image that compresses at least a portion of the panoramic image to reduce at least the horizontal resolution of the panoramic image in regions adjacent to side edges thereof.

According to another embodiment, the display includes an opaque display, a pico-projector display, a retina projector, a color display, a monochrome display, a liquid-crystal display, a light-emitting-diode display, or a cathode ray tube display.

According to another embodiment, the camera includes a fixed camera or a pan/tilt camera.

According to another embodiment, the camera has a resolution greater than that of any one of the sensors.

According to another embodiment, the system is disposed on or within an accessory that is wearable on a living body, on or within an asset, or within or around a land or water installation.

According to an embodiment, a method for producing a panoramic image is provided, the method including: providing a plurality of image sensors, each sensor having a field of view that overlaps the field of view of immediately adjacent sensors; stitching image data from respective ones of the sensors into a single, 360 degree panoramic image; defining a focus view of the image in which image resolution is greater than that in other regions of the image; and gradiently compressing the image data continuously from the focus view of the image to vertical and horizontal edges thereof.

According to another embodiment, the method further includes displaying the image on a display such that the focus view of the image is disposed at about a center of the display.

According to another embodiment, the sensors are disposed in an approximately circular pattern to sense in a direction extending radially outward from or radially inward toward a center of the pattern.

According to another embodiment, the method further includes providing a camera having a field of view and resolution that is greater than that of any one of the sensors; aiming the camera such that a center of the field of view of the camera is aligned with a center of the focus view of the image; and stitching an image produced by the camera into the panoramic image.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method for displaying a panoramic view image, the method comprising:
   obtaining a panoramic image, wherein the panoramic image comprises a central portion and peripheral portions;
   applying a mapping function to the peripheral portions of the panoramic image to spatially compress each peripheral portion of the panoramic image based on a continuously increasing compression gradient that increases with distance from the central portion of the panoramic image to obtain, for each peripheral portion, a corresponding spatially compressed peripheral portion; and displaying, on a display device, the spatially compressed peripheral portions together with the central portion of the panoramic image, wherein, for each spatially compressed peripheral portion, one or more dimensions of the spatially compressed peripheral portion are smaller than a corresponding one or more dimensions of the corresponding peripheral portion to which the mapping function is applied.

2. The method of claim 1, wherein the applying comprises applying the mapping function to spatially compress the peripheral portions of the panoramic image on at least two opposing sides of the central portion of the panoramic image.

3. The method of claim 1, wherein the panoramic image comprises a 360 degree field of view image and wherein the continuously increasing compression gradient comprises a linear compression gradient or a compression gradient specific to a particular viewer.

4. The method of claim 1, wherein the obtaining of the panoramic image comprises receiving a stitched image or a virtual image from an external system.

5. The method of claim 1, wherein the obtaining of the panoramic image comprises:
transmitting video data from a plurality of sensors disposed on a wearable structure to a data processor, wherein the plurality of sensors comprises a plurality of imaging modules, and wherein the wearable structure comprises a helmet; and
stitching the video data from respective ones of the plurality of sensors to form the panoramic image with the data processor.

6. The method of claim 1, wherein:
the peripheral portions comprise first peripheral portions;
the applying comprises defining a focus view, the first peripheral portions, and second peripheral portions of the panoramic image;
the focus view is a central focus view disposed in a center region of the panoramic image;
the first peripheral portions are located between the central focus view and side edges of the panoramic image;
the applying comprises applying the mapping function to reduce at least a horizontal resolution in the first peripheral portions;
the panoramic image comprises upper and lower edges disposed above and below the center region and running between the side edges;
the second peripheral portions are located between the central focus view and the upper and lower edges; and
the applying further comprises applying the mapping function to reduce a vertical resolution of the panoramic image in the second peripheral portions.

7. A system, comprising:
memory configured to store a panoramic image, wherein the panoramic image comprises a central portion and peripheral portions;
a processor configured to apply a mapping function to the peripheral portions of the panoramic image to spatially compress each peripheral portion of the panoramic image based on a continuously increasing compression gradient that increases with distance from the central portion of the panoramic image to obtain, for each peripheral portion, a corresponding spatially compressed peripheral portion; and a display configured to display the spatially compressed peripheral portions together with the central portion of the panoramic image, wherein, for each spatially compressed peripheral portion, one or more dimensions of the spatially compressed peripheral portion are smaller than a corresponding one or more dimensions of the corresponding peripheral portion to which the mapping function is applied.

8. The system of claim 7, wherein the processor is configured to apply the mapping function to spatially compress the peripheral portions of the panoramic image on at least two opposing sides of the central portion of the panoramic image.

9. The system of claim 7, wherein the panoramic image comprises a 360 degree field of view image and wherein the continuously increasing compression gradient comprises a linear compression gradient or a compression gradient specific to a particular viewer.

10. The system of claim 7, further comprising:
a wearable structure; and
a plurality of sensors disposed on the wearable structure, wherein the plurality of sensors is configured to transmit video data to the processor, and wherein the processor is configured to stitch the video data from respective ones of the sensors to form the panoramic image.

11. The system of claim 10, wherein the plurality of sensors comprises a plurality of imaging modules disposed on the wearable structure, and wherein the wearable structure comprises a helmet.

12. The system of claim 7, wherein:
the peripheral portions comprise first peripheral portions;
the processor is configured to define a focus view, the first peripheral portions, and second peripheral portions of the panoramic image;
the focus view is a central focus view disposed in a center region of the panoramic image;
the first peripheral portions are located between the central focus view and side edges of the panoramic image;
the processor is configured to apply the mapping function to reduce at least a horizontal resolution in the first peripheral portions;
the panoramic image comprises upper and lower edges running between the side edges;
the second peripheral portions are located between the central focus view and the upper and lower edges; and
the processor is further configured to apply the mapping function to reduce a vertical resolution of the panoramic image in the second peripheral portions.

13. The method of claim 1, wherein the central portion is associated with a forward looking direction, wherein a size of each spatially compressed peripheral portion comprises a horizontal dimension and a vertical dimension arranged on the display device, and wherein at least one of the horizontal dimension or the vertical dimension of each spatially compressed peripheral portion is based on an angular distance of the associated peripheral portion from the forward looking direction.

14. The method of claim 1, wherein the displaying comprises displaying the spatially compressed peripheral portions and the central portion together as part of a substantially rectilinear image, wherein the central portion is associated with a forward looking direction, and wherein each of the spatially compressed peripheral portions is arranged on one of at least two opposing sides of the central portion based on an angular distance of the associated peripheral portion from the forward looking direction.

15. A method for displaying a panoramic view image, the method comprising:
- obtaining a panoramic image, wherein the panoramic image comprises a central portion and peripheral portions, and wherein the central portion is associated with a forward looking direction;
- applying a mapping function to the peripheral portions of the panoramic image to spatially compress the peripheral portions of the panoramic image to obtain spatially compressed peripheral portions; and
- displaying, on a display device, the spatially compressed peripheral portions together with the central portion of the panoramic image, wherein the displaying comprises displaying the central portion together with a substantially rectilinear image formed of the spatially compressed peripheral portions, wherein a position of each spatially compressed peripheral portion on the display device is based on an angular distance between the associated peripheral portion and the forwarding looking direction, wherein the central portion and the rectilinear image together form a 360 degree view about the forward looking direction, and wherein, for each spatially compressed peripheral portion, one or more dimensions of the spatially compressed peripheral portion are smaller than a corresponding one or more dimensions of the associated peripheral portion to which the mapping function is applied.

16. The method of claim 1, wherein the applying comprises, for each of the peripheral portions, spatially compressing the peripheral portion by a continuously increasing amount from one side of the peripheral portion to an opposing side of the peripheral portion.

17. The method of claim 15, wherein a peripheral portion at a larger angular distance from the forward looking direction has an associated spatially compressed peripheral portion of a smaller size than an associated spatially compressed peripheral portion of a peripheral portion at a smaller angular distance from the forward looking direction.

18. The system of claim 7, further comprising:
- a wearable structure comprising:
  - a projector configured to provide, on the display, the spatially compressed peripheral portions and the central portion of the panoramic image, wherein the display is coupled to the wearable structure.

19. The method of claim 1, wherein at least one of the spatially compressed peripheral portions has the same vertical dimension and a different horizontal dimension from at least one other of the spatially compressed peripheral images.

20. The method of claim 15, wherein the applying comprises applying the mapping function to the peripheral portions to spatially compress the peripheral portions based on a continuously increasing compression gradient that increases with distance from the central portion of the panoramic image.

\* \* \* \* \*